US012462786B2

(12) United States Patent
Mishra

(10) Patent No.: US 12,462,786 B2
(45) Date of Patent: Nov. 4, 2025

(54) METHODS AND SYSTEMS FOR GENERATING PERSONAL VIRTUAL AGENTS

(71) Applicant: LIVEPERSON, INC., New York, NY (US)

(72) Inventor: Amit Mishra, Bloomfield, CO (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 18/196,113

(22) Filed: May 11, 2023

(65) Prior Publication Data
US 2023/0368773 A1 Nov. 16, 2023

Related U.S. Application Data

(60) Provisional application No. 63/340,582, filed on May 11, 2022.

(51) Int. Cl.
*G10L 13/033* (2013.01)
*G10L 15/06* (2013.01)

(52) U.S. Cl.
CPC .......... *G10L 13/033* (2013.01); *G10L 15/063* (2013.01); *G10L 2015/0631* (2013.01)

(58) Field of Classification Search
CPC .............. G10L 13/033; G10L 15/063; G10L 2015/0631; G10L 15/30; G10L 15/22; G06F 3/167
See application file for complete search history.

(56) References Cited

U.S. PATENT DOCUMENTS

| | | | |
|---|---|---|---|
| 10,332,513 B1 * | 6/2019 | D'Souza | G10L 15/22 |
| 12,190,906 B1 * | 1/2025 | Venkataraman | G10L 15/32 |
| 2010/0226490 A1 * | 9/2010 | Schultz | H04M 3/5233 379/265.09 |
| 2011/0060587 A1 * | 3/2011 | Phillips | G10L 15/30 704/235 |
| 2013/0095807 A1 * | 4/2013 | Bhaumik | H04M 3/51 455/417 |
| 2018/0314689 A1 * | 11/2018 | Wang | G10L 15/1822 |
| 2018/0336894 A1 * | 11/2018 | Graham | G06F 16/3329 |
| 2019/0034413 A1 * | 1/2019 | Rosewell | G06F 40/279 |

(Continued)

OTHER PUBLICATIONS

International Search Report and Written Opinion of Aug. 23, 2023 for PCT Application No. PCT/US2023/021837, 16 pages.

*Primary Examiner* — Michael Colucci
(74) *Attorney, Agent, or Firm* — POLSINELLI LLP

(57) ABSTRACT

Systems and method are provided for generating personal virtual agents. A computing device may receive communication request from a first device associated with a particular domain. In response, the computing device may facilitate a connection between the first device and a personal virtual agent that was generated for a user corresponding of, wherein the first device. The computing device may execute the personal virtual agent using a subsequent communication from the first device to generate a response. The computing device may generate an accuracy metric corresponding to the response generated by the personal virtual agent. The personal virtual agent may be trained using the accuracy metric to improve subsequent response generated by the personal virtual agent with respect to the user of the first device.

20 Claims, 9 Drawing Sheets

(56) References Cited

U.S. PATENT DOCUMENTS

| | | | |
|---|---|---|---|
| 2019/0324779 A1* | 10/2019 | Martin | G06F 3/0481 |
| 2020/0341852 A1* | 10/2020 | Chopra | G06F 11/1451 |
| 2021/0027770 A1* | 1/2021 | Olabiyi | G06F 40/284 |
| 2021/0134284 A1 | 5/2021 | Adibi et al. | |
| 2021/0174783 A1 | 6/2021 | Wieman et al. | |
| 2022/0067556 A1* | 3/2022 | Watson | G06N 3/004 |
| 2022/0318518 A1* | 10/2022 | Mars | G06N 5/04 |
| 2023/0044417 A1* | 2/2023 | Nagar | G10L 15/083 |

* cited by examiner

METHODS AND SYSTEMS FOR GENERATING PERSONAL VIRTUAL AGENTS

CROSS REFERENCE TO RELATED APPLICATIONS

The present patent application claims the benefit of priority to U.S. Provisional Patent Application No. 63/340,582 filed May 11, 2022, which is incorporated herein by reference in its entirety for all purposes.

TECHNICAL FIELD

This disclosure generally relates to personal virtual agents; and more specifically to generating virtual communication services customized for communications with particular users.

BACKGROUND

Automating devices and/or processes may increase the operating efficiency of some systems. As a result, many such systems attempt to implement various levels of automation. In some instances, such as when the device and/or process of a system are homogenous, an automation solution that works for one device and/or process may similarly be applied to other such devices and/or processes. When the devices and/or processes of a system are not homogeneous, an automated solution applicable to one device may not be operable for other such devices. In those instances, some systems may generate generic automated solutions that can be applied to the non-homogenous devices and/or processes. Generic automation solutions may be configured to automate aspects of such devices and/or processes that may be common among the devices and/or processes. Yet, generic automation solutions may induce hardware and/or software faults in devices and/or processes that may not be common within the system and/or devices and/or processes that have differing configurations. For example, a resource library (e.g., such as an application programming interface, etc.) may be usable to automatically obtain data from a set of remote storage devices within a system. The resource library may only be operable when the set ore remote storage devices are homogenous (e.g., in hardware and/or software configuration, etc.). If not, and the resource library may cause a system fault when attempting to access a disparate remote storage device (e.g., such as an exception, interrupt, etc.). Systems that implement large quantities of heterogenous device and/or processes (i.e., most systems in operation), may not be suitable for generic automation solutions.

SUMMARY

Methods and systems are described herein for generating personal virtual agents. The methods include: receiving a communication request associated with a particular domain, the communication request including a user identifier associated with a first device; facilitating a connection between the first device and a personal virtual agent, the personal virtual agent having been generated for a user corresponding to the user identifier, wherein the personal virtual agent is a software service that executes to provide services associated with the particular domain to the user; executing the personal virtual agent using a communication from the user associated with the request to generate a response; generating, based on executing the personal virtual agent, an accuracy metric corresponding to the response generated by the personal virtual agent; and training the personal virtual agent based on the accuracy metric, wherein training the personal virtual agent improves subsequent responses generated by the personal virtual agent with respect to the user Systems are described herein for generating personal virtual agents. The systems include one or more processors and a non-transitory computer-readable medium storing instructions that, when executed by the one or more processors, cause the one or more processors to perform any of the methods as previously described.

Non-transitory computer-readable media are described herein for storing instructions that, when executed by the one or more processors, cause the one or more processors to perform any of the methods as previously described.

These illustrative examples are mentioned not to limit or define the disclosure, but to aid understanding thereof. Additional embodiments are discussed in the Detailed Description, and further description is provided there.

DETAILED DESCRIPTION

Figure 1:
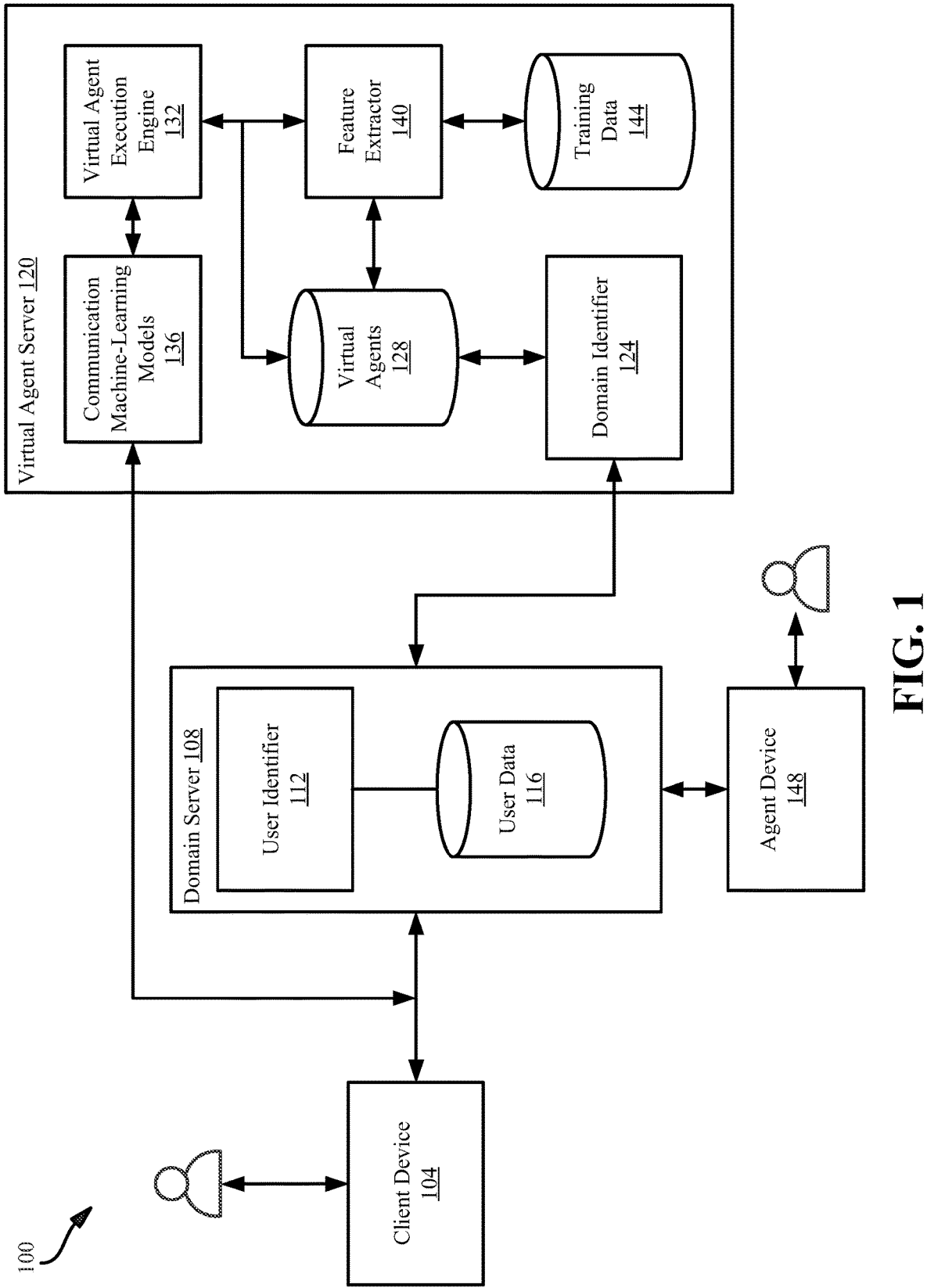
FIG. 1 illustrates an example system 100 for generating, maintaining, and executing personal virtual agents configured to operate as a communication interface between one or more domains and a client device according to aspects of the present disclosure.

The present disclosure includes systems and methods for generating personal virtual agents. A computing device of a domain may operate hierarchy of automated services that can be provided to user devices connecting to the domain. The hierarchy of automated services may include automated processes (e.g., predetermined routines that may be executed by the computing device), a virtual agent (e.g., hardware and/or software configured to communicate with the user device over one or more communication channels such as, for example, a bot, etc.), a domain-specific virtual agent (hardware and/or software configured to communicate with the user device over one or more communication channels on behalf of a particular domain, etc.), a personal virtual agent (e.g., hardware and/or software generated for a particular user or user device based on information known about the particular user or user device and configured to communicate with the particular user or user device on behalf of one or more domains, etc.), and/or the like.

When a user device connects to the computing device, the computing device may use the hierarchy of automated services to identify a particular automated service to communicate with the user device. For example, a user device may connect to a domain to resolve a particular intent of the user of the user device. The domain may first attempt to connect the user device to a personal virtual agent of the user device to resolve the intent. If the domain does not include a personal virtual agent for the user device, then the domain may attempt to connect the user device to an automated agent. If the domain does not include an automated agent, then the domain may determine if an automated process may resolve the particular intent of the user device. If the domain determines that there are no such automated processes that may resolve the particular intent or the selected automated service fail to resolve the particular intent, the user device may be connected to a client device (e.g., operated by a human agent) that is configured to communicate with the user device to resolve the particular intent.

Personal virtual agents may be configured to tailor services provided by the domain to particular user devices and/or users thereof. In some instances, the domain may generate a personal virtual agent for a particular user device and/or the user thereof based on historical interactions between the user and the domain. In other instances, a personal virtual agent may be generated for the user device and/or the user thereof for use in accessing the service of one or more domains. In those instances, the user device may be connected to the personal virtual agent generated for the user device. The personal virtual agent may include interfaces configured to enable communications to each of the domains. The personal virtual agent may use the interfaces to resolve the particular intent of the user device regardless of the particular domain associated with the issue. The resolution of the issue may be tailored by the personal virtual agent to the user device based on one or more characteristics of the user device and/or user thereof (e.g., particular information known about the user device, historical interactions between the user device and the domain associated with the resolution, the domain associated with the resolution, the resolution of the particular intent, time of day, time of year, and/or the like).

Personal virtual agents may include one or more machine-learning models trained using data associated with a particular user device and/or the user thereof. The one or more machine-learning models may include one or more classifiers (e.g., configured to generate predictions associated with the particular user device and/or the user thereof, etc.), one or more natural language processors (e.g., configured to generate natural language communications and/or parse natural language communications), models configured to generate audio from text, models configured to generate text from audio, models configured to resolve queries and/or other requests by the user device and/or the user thereof, and/or the like. The one or more machine-learning models may be configured as individual machine-learning models, the outputs of which being coordinated to provide the particular resolution to the user device and/or the user thereof. Alternatively, or additionally, the one or more machine-learning models (or a portion thereof) may be configured as an ensemble machine-learning model that may provide the functionality of one or more of the one or more machine-learning models.

The one or more machine-learning models may be trained synchronously (e.g., at the same time) or asynchronously. A computing device may host personal virtual agents for one or more domains. The one or more domains may provide data associated with a particular user device and/or user thereof such as, but not limited to, demographic information associated with the user of the user device, hardware and/or software information (e.g., user device identifier, a mobile ad ID (MAID), hardware components of the device, software components of the device, hardware and/or software used to access the computing device or a respective domain, an identification of other devices associated with the user device used to access the computing device or a respective domain, and/or the like), network information associated with the user device and/or the user thereof (e.g., such as an Internet Protocol (IP) address of the user device or devices used by the user to access the computing device or a respective domain, media access control address, historical interactions with a respective domain, data generated and or derived by the one or more domains associated with the user device and/or the user thereof, data received by the one or more domains (e.g., from another domain, device, network, etc.) that is associated with the user device and/or the user thereof, and/or the like.

The computing device may use the data received from the one or more domains and/or data received from the user device and/or the user thereof to generate training data for each machine-learning model of the one or more machine-learning models. The computing device may tailor the training data based on a type of machine-learning model being trained and/or the type of output to be generated by the machine-learning model. For instance, machine-learning models configured to process human speech may include recurrent neural networks (e.g., such as a long short-term memory, gated neural network, multi-layer perceptron, mem-resistive network, etc.), classifiers, large language modules, and/or the like, that may be trained by multiple sets of features structured into feature vectors according to a particular dimension (e.g., such as time, frequency, etc.). The feature vectors maybe processed by the recurrent neural network over a predetermined quantity of iterations or until one or more performance benchmarks are reached (e.g., accuracy, recall, F1 score, etc.). Other models, such as a classifier, may be based on a neural network or support vector machine architecture, which may use different features (e.g., based on classifications to be predicted by the classifier, etc.), according to a different structure (e.g., such as a one not based on the dimension as the feature vectors used for a recurrent neural network, etc.), and/or trained over a different quantity of iterations or performance benchmarks.

Once the one or more machine-learning models of the personal virtual agent are trained, the personal virtual agent may be used to provide services of the one or more domains tailored for the user device and/or the user thereof. In some examples, a user device may connect to the computing device to interact with the personal virtual agent generated for the user device. The user device may execute queries associated with a domain, request particular services of a domain, and/or the like. The personal virtual agent may use one or more interfaces to connect to the domain to execute the query, the particular services, etc. Responses from the domain may be translated by the personal virtual agent into a form tailored for the user device and/or the user thereof. For example, the personal virtual agent may structure a response to a query into a natural language format based on a language or dialect of the user.

In other examples, the user device may connect directly to a domain. Upon establishing a connection with the domain, the domain may transmit a communication to the computing device requesting execution of the personal virtual agent associated with the user device. If a personal virtual agent is identified, the domain and/or the computing device may cause communications between the user device and the domain to be filtered through the personal virtual agent (e.g., as previously described). If a personal virtual agent associated with the user device is not identified, then the domain may execute a generic virtual agent of the domain to communicate with the user device (if generated and available), one or more automated processes (e.g., such as an automated telephony attendant, etc.) if the domain does not include generic virtual agents, or connect the user device to a terminal device operated by an agent if the domain does not include generic virtual agents or automated processes.

In still yet other examples, the personal virtual agent may be stored on or executed by the user device. In those examples, the personal virtual agent may establish a connection between the user device and the domain, filter communications between the user device and the domain, tailor communications between the user device and the domain to the user device and/or the user thereof, etc. The personal virtual agent may connect to the computing device, remote storage devices (e.g., such as servers and/or databases, etc.), other domains, etc. to obtain information (e.g., associated with the user device and/or the user thereof, an intent of the user and/or user device in connecting to the domain, etc.), interfaces (e.g., application programming interfaces, communication interfaces, hardware interfaces, etc.), and/or the like that may enable the personal virtual agent to resolve the intent of the user device in connecting to the domain.

FIG. 1 illustrates an example system 100 for generating, maintaining, and executing personal virtual agents configured to operate as a communication interface between one or more domains and a client device according to aspects of the present disclosure. System 100 may provide personal virtual agents for a particular user and/or a particular user group configured to operate as a personalized communication interface between the user and/or user group and one or more domains. A user may operate client device 104 (e.g., a mobile device such as a smartphone, desktop or laptop computer, tablet, telephone, etc.) to establish a connection with domain server 108. The connection may be a voice-based connection (e.g., such as telephone call, voice-over-IP, etc.), an audio-visual based connection, and/or a data-based connection. Client device 104 may establish the connection with domain server 108 to execute one or more queries (e.g., information requests, etc.), provide resources, resolve issues and/or complaints, and/or the like. For example, domain server 108 may be operated by a domain that corresponds to a particular company. The user may connect to domain server 108 to request information associated an account of the user with the domain (e.g., such as a current balance, etc.).

Once the connection is established, domain serve 108 may identify client device 104 and/or the user thereof. Domain server 108 may identify client device 104 based on characteristics of the connection (e.g., a telephone number, an Internet Protocol (IP), address, media access control address, an internet service provider, a location of the client device, etc.). Domain server 108 may use information received from client device 104 and/or the user thereof such as, but not limited to, a user identifier, one or more pieces of personal identifiable information, voice-print identification (e.g., matching audio transmitted over the connection with a stored audio print, etc.), a cryptographic key, password, etc. in addition to or in place of the characteristics of the connection to identify the user device and/or the user thereof.

Upon identifying client device 104 and/or the user thereof, domain server 108 may retrieve a user identifier that corresponds to the identified client device 104 and/or the user thereof from user identifiers 112. The user identifier may be associated with a data record of user data 116 that stores data that corresponds to client device 104 and/or the user. If client device 104 and/or the user thereof is new to domain server 108, domain server 108 may use user identifier 112 to define a new user identifier for client device 104 and/or the user thereof. Domain server 108 may then generate a data record in user data 116 that corresponds to client device 104 and/or the user thereof in association with the new user identifier. The data record may include information received from client device 104 and/or the user thereof, data generated and/or derived by domain server 108, data generated and/or derived by agent device 140 and/or the agent operating agent device 140, data received from one or more remote devices and/or agents, and/or the like. In some instances, the data record may store historical instances in which client device 104 and/or the user thereof connected to domain server 108.

Domain server 108 may determine how to process communications between client device 104 and domain server 108. In some instances, domain server 108 may connect client device 104 to agent device 104. Agent device 104 may provide audio-based (e.g., such as voice) communications from an agent of domain server 108 to resolve the reason of client device 104 and/or the user thereof in connecting to domain server 108. In other instances, domain server 108 may connect client device 104 to a virtual agent. A virtual agent may be an automated service configured to communicate with client device 104 and/or the user thereof. The automated service may include one or more audio-to-text converters (e.g., configured to convert voice communications into corresponding alphanumeric text, etc.), one or more natural language processors (e.g., configured to parse natural language into machine-readable instructions and machine-readable instructions into natural language), one or more machine-readable processor (e.g., configured to process the machine-readable instructions and generate a machine-readable response that can be passed back to the natural language processor or another system), and/or the like. The virtual agent may be used to resolve simple queries and/or issues of the client device 104 and/or the user thereof. For example, client device 104 may connect to domain server 108 to determine a time interval over which a physical location of the domain is available to the user, the virtual agent may convert the audio query into text, process the text using a natural language processor, and generate a result using a machine-readable processor that corresponds to the requested time interval. The virtual agent may then convert the requested time interval into a natural language textual statement that can be converted into a voice representation. The voice representation of the requested time interval can be provided to the client device 104 over the connection with domain server 108.

In still yet other instances, domain server 108 may connect client device 104 to a personal virtual agent. A personal virtual agent may be a virtual agent generated for a particular client device 104, a particular user of client device 104, a particular group of users (e.g., such as a family, friends, users that have one or more common characteristics, and/or the like). The personal virtual agent may operate using historical information associated with the particular client device 104, a particular user of client device 104, a particular group of users across one or more domains. Examples of such information include, but is not limited to, information associated historical instances of connections a particular domain of the one or more domains, demographic information, personal identifiable information, information received by the one or more domains that corresponds to the particular user, information generated and/or derived by the one or more domains that corresponds to the particular user, information received from the particular user, information received from devices operated by the particular user, information associated with devices operated by the particular user, and/or the like.

Personal virtual agents may provide the functionality of the virtual agent of a particular domain as a service tailored to the particular user. For example, personal virtual agents may be configured to communicate using personalized communication characteristics such as, but not limited to a particular language, diction, slang, phrases, syntax, grammar, voice pattern voice pattern (e.g., male or female voice, pitch, cadence, accent, pronunciation, etc.), and/or the like. Personal virtual agent may also be configured to generate communications based on information known about the particular user. The personalized communication characteristics of may be selected by domain server 108, the domain with which client device 104 and/or the user thereof is currently communicating, automated communication server 120, client device 104 and/or the user thereof, the personal virtual agent (e.g., based on one or more machine-learning classifications using historical information associated with client device 104 and/or the user thereof), and/or the like. For example, a particular user may request information associated with a physical location of a domain. The personal virtual agent may use a location of client device 104 (e.g., based on a known location of the particular user and/or client device 104, an address of the particular user, etc.) to identify a particular physical location of the domain that is closest to the particular user to generate a response. The response may be provided to the particular user using a particular language and/or diction that is personal to the particular user.

Client devices and/or the users thereof may be registered with automated communication server 120 by one or more domains. Automated communication server 120 may include one or more devices and/or software components configured operate as a Contact Center as a Service (CCaaS) for domains. Domain server 108 may provide access to information received and/or generated by domain server 108. The information may include information associated with the domain and/or domain operations, information associated with client device 104 and/or the user thereof, and/or the like. The information may be usable by a personal virtual agent to provide personalized communications on behalf of domain server 108 to resolve an intent of client device 104 and/or the user thereof in connecting to domain server 104. In some instances, the information may be usable to train personal virtual agents, other virtual agents, etc.

When a domain registers with automated communication server 120 or registers a particular client device and/or the users thereof, the domain may indicate whether information from the domain may be shared when automated communication server 120 provides services associated with other domains. In an illustrative example, a client device may access a travel domain to receive travel information for a particular destination and a particular set of dates. Later, the client device may access a hotel domain to reserve rooms over the particular set of dates. If the travel domain indicates that information may be shared with the hotel domain, when the client device accesses the hotel domain, a virtual agent may access information from the connection with the travel domain (e.g., such as the destination, the set of dates, etc.). The particular user may then reserve the rooms without providing redundant information that was previously provided to the travel domain.

Domains may indicate whether information sharing is enabled for all client devices (and/or the users thereof), individual client devices (and/or individual users thereof), and/or the like. Domains may also identify other domains for which information sharing may be enabled. For instance, domains may indicate that each domain registered to automated communication server 120 is enabled, identify particular domains that are to be enabled, identify criteria which must be satisfied before information sharing is to be enabled (e.g., such as that the other domain is also enabling information sharing, etc.), and/or the like. In some instances, domains may provide constraints that limit information sharing such as, but not limited to, a quantity of information that can be shared before information sharing is to be terminated or limited (for all client devices and/or users or particular client devices and/or particular users), types of information that can be shared, and/or the like.

Domains may provide access to the information of the domain using one or more overlapping access channels. Examples of such access channels include, but are not limited to, application programming interfaces (APIs), access credentials (e.g., to one or more devices, networks, virtual private networks, etc. of the domain) configured to provide manual or automated access to the information, download, and/or the like. In instances in which multiple access channels are utilized to access the information, the access channels may be accessed in series or in parallel. For instance, the automated communication server 120 may access some information through one or more API functions while other information may be accessed using access credentials (e.g., manually by a user, semi-manually, or automatically).

Domain server 108 may transmit a communication to automated communication server 120 requesting access to virtual agent. The communication may include the user identifier, an identification of domain server 108 or the corresponding domain, information associated with the intent of client device 104 and/or the user thereof, and/or the like. Automated communication server 120 may use the communication and/or characteristics of the communication to identify client device 104 and/or the user thereof or the domain, determine if client device 104 and/or the user thereof has been registered with automated communication server 120, and/or determine if a personal virtual agent has been generated for client device 104 and/or the user thereof.

In some instances, automated communication server 120 may use the user identifier to identify the personal virtual agent that corresponds to the user identifier. Automated communication server 120 may generate a universally unique identifier (UUID) for a user when the user is registered with automated communication server 120. Automated communication server 120 may store the UUID in associated with the user identifier of each domain that has registered that user with automated communication server 120. When domain server 108 transmits are a request including a user identifier of domain server 108, Automated communication server 120 executes a lookup using the user identifier of domain server 108 to identify the UUID for that user. Automated communication server 120 may then use information received and/or generated by any domain that registered that user when executing the personal virtual agent associated with that user.

In other instances, automated communication server 120 may use other information to identify to identify the proper personal virtual agent. Each domain may use a different scheme to generate user identifiers for users that connect or interact with that domain. As a result, using a user identifier of a domain may not be sufficient to identify a particular user or the personal virtual agent that corresponds to the particular user. Instead, automated communication server 120 may use other information associated with the domain to identify the particular user. Automated communication server 120 may identify a domain identifier that corresponds to domain server 108 and/or the domain thereof using domain identifier 124. The domain identifier and the user identifier may be sufficient to identify the UUID that corresponds to the particular user.

If automated communication server 120 identifies the personal virtual agent corresponding to the particular user in virtual agents 128, then the personal virtual agent is passed to virtual agent execution engine 132 where it is executed to communicate with client device 104 and/or the user thereof. Domain server 108 may establish a parallel connection between client device 104 and automated communication server 120 to enable direct communications between client device 104 and the personal virtual agent. Alternatively, automated communication server 120 may join the connection between client device 104 and domain server 108 (e.g., as a three-way connection). Alternatively still, domain server 108 may reroute the connection between client device 104 and domain server 108 to automated communication server 120 and disconnect. Domain server 108 (in either scenario) may maintain the connection with automated communication server 120 to provide user information or domain-specific information to the personal virtual agent, monitor the interaction for analytics and/or to improve subsequent interactions with client device 104 and/or the user thereof, and/or provide any other support to the personal virtual agent to improve a likelihood that of satisfying the intent of client device 104 and/or the user thereof in establishing the initial connection with domain server 108.

Communications between personal virtual agents and client device 104 and/or the user thereof may pass through a machine-learning interface (i.e., communication machine-learning models 136) that enables presenting communications in a particular form and format of the client device 104 and/or the user thereof. Communication machine-learning models 136 may include one or more machine-learning models and/or other artificial intelligence modules configured to translate between a human operator (e.g., the user of client device 104) and the machine-readable output of the personal virtual agents. The one or more machine-learning models may include a voice-to-text machine-learning model configured to receive voice communications from client device 104 and translate the voice communications into alphanumeric text, a first natural-language processor configured to translate the alphanumeric text from natural language into machine-readable instructions that can be processed by the personal virtual agent, a second natural-language processor configured to translate the personal virtual agent responses into natural language alphanumeric text, a text-to-voice machine-learning model configured to translate alphanumeric text from the second natural language processor into a voice communication response that can be provided to client device 104. Communication machine-learning models 136 may include other machine-learning models, artificial intelligence, and/or interfaces to communicate with client device 104 and/or the user thereof.

Personal virtual agents may include one or more machine-learning models configured to process machine-readable instructions that correspond to user input and generate an output that corresponds to a response to the user input. The one or more machine-learning models may include neural networks (e.g., such as, but not limited to, deep learning networks, concurrent neural networks, recurrent neural networks, etc.), decision trees, support vector machines, k-nearest neighbors, Naïve Bayes, random forest classifiers, regression-based models, and/or the like.

Virtual agent execution engine 132 may stream the communications receive from client device 104 to feature extractor 140 (e.g., after being processed by communication machine-learning models 136. The stream may include the machine-readable instructions (output from a natural language processor), characteristics of the connection between client device 104 and domain server 108, characteristics of the connection between client device 104 and automated communication server 120, characteristics of the connection between domain server 108 and automated communication server 120, frequency-based data (for voice-based communications), characteristics of communications transmitted by client device 104 (e.g., alphanumeric text, average rate of communications, average rate of any input, type of input, etc.), and/or the like. Feature extractor 140 may extract features from discrete portions of the stream. In some instances, feature extractor 140 may extract feature use a predefined window (e.g., overlapping or non-overlapping) and extract the features of the stream that are within the predefined window. The predefined window may iterate over the stream at a predetermined rate such that features are extracted in real time or near real time.

Feature extractor 140 may generate a feature vector from the extracted features that may be passed to virtual agent execution engine 132. Virtual agent execution engine 132 may execute the personal virtual agent using the feature vector to generate an output (e.g., a response to the communications received from client device 104). The output may be passed through communication machine-learning models 136 to convert the output into a form and format that can be parsed by client device 104 such as, but not limited to, natural language alphanumeric text, natural language verbal communications, executable instructions (e.g., in a format executable by client device 104 such as bytecode, machine code, assembly code, a script, instructions in a language that can be compiled by client device 104, etc.), machine-readable instructions (e.g., that can be translated into another form or format by a communication machine-learning model executed by client device 104), in a communication protocol that may be received and/or parsed by client device 104, combinations thereof, or the like. Feature extractor 140 may generate feature vectors continuously in real time or near real time to enable virtual agent execution engine to communicate with client device 104 in real time (e.g., to preserve an appearance that client deice 104 is communicating with a human agent).

The one or more machine-learning models may be trained using supervised learning, unsupervised learning, semi-supervised learning, reinforcement learning, and/or the like. Automated communication server 120 may store user interaction data received and/or derived from user interaction with domain server 108 (e.g., received from domain server 108), user interaction data received and/or derived from user interaction with other domains (e.g., received from those domains), historical communications between client device 104 and/or the user thereof and automated communication server 120, historical communications between client device 104 and/or the user thereof and the personal virtual agent, user data 116, any other data associated the user, and/or the like. Automated communication server 120 may store the training data in training data 144. Automated communication server 120 may also store characteristics and/or a complete record of the entire communication between client device 104 and the personal virtual agent (e.g., from connection to disconnection, etc.)

Feature extractor 140 may define feature vectors from the training data usable to train each of the one or more machine-learning models of the personal virtual agent and the communication machine-learning models. Feature extractor 140 may define a set of feature vectors for each machine-learning model that corresponds to the particular machine-learning model and/or the output to be generated by the particular machine-learning model. For example, a voice-to-text machine-learning model may be a recurrent neural network (e.g., such as a long-short term memory, continuous-time neural network, recursive neural network, etc.) for which feature extractor 140 may define feature vectors that correspond to voice communications with, if using supervised learning, corresponding text labels (e.g., provided by manual analysis, client device 104 and/or the user thereof, agent device 148 and/or the agent thereof, another machine-learning model, and/or the like). For a classifier (e.g., such as support vector machine), feature extractor may define vectors that include features predictive of a particular classification to be output from the classifier. The features vectors generated by feature extractor 140 may include a set of features or sequence of features (e.g., ordered according to a particular dimension such as a time or classification). Automated communication server 120 may store the feature vectors generated form the training data in training data 144 for use in training future machine-learning models, retraining machine-learning models, reinforcement learning, and/or the like.

Virtual agent execution engine 132 may train each machine-learning model of the personal virtual agent and the communication machine-learning model 136 using the sets of feature vectors generated from the training data. Each machine-learning model may be trained until one or more accuracy metrics reach threshold values. Examples of accuracy metrics include, but are not limited to, accuracy, recall, F1 score, confusion matric, logarithmic loss, mean absolute error, mean squared error, area under the curve (ROC), and/or the like). In some instances, virtual agent execution engine 132 and/or user input may be used to select the particular accuracy metrics to be used for a particular machine-learning model and correspond thresholds indicative of a passing accuracy. The personal virtual agent may be trained using reinforcement learning with each execution of the machine-learning models of the personal virtual agent and/or after each connection with client device 104 and automated communication server 120. Reinforcement learning may enable the personal virtual agent to learn from each interaction with client device 104 to improve the outputs from the machine-learning models of the personal virtual agents and better tailor the outputs of the personal virtual agent to the particular client device 104 and/or the particular user thereof.

In some instances, automated communication server 120 may not identify a personal virtual agent for user identifier provided by domain server 108. For example, the user may be new to domain server 108, new to automated communication server 120, and/or the like. Virtual agent server may instantiate a general virtual agent to initiate communications with client device 104. The general virtual agent may request additional information to identify client device 104 and/or the user thereof and determine if a personal virtual agent exists for that client device 104 and/or the user thereof. If no such personal virtual agent exists, automated communication server 120 may continue to operate the general virtual agent. Automated communication server 120 may store interactions with the general virtual agent for use in training a personal virtual agent for the new user. Automated communication server 120 may request information from domain server 108 and other domains that corresponds to the new user. Automated communication server 120 may identify the new user using personal identifiable information of client device 104 and/or the user thereof (e.g., upon receiving consent from client device 104 and/or the user thereof for the use of such personal identifiable information) and/or any non-personal identifiable information (such as when consent for using personal identifiable information is not received). Automated communication server 120 may then train a new personal virtual agent for the new user using the interactions with the general virtual agent and any information received over time. The personal virtual agent may learn with each communication between client device 104 and the personal virtual agent becoming more tailored and accurate with each additional interaction.

Figure 2:
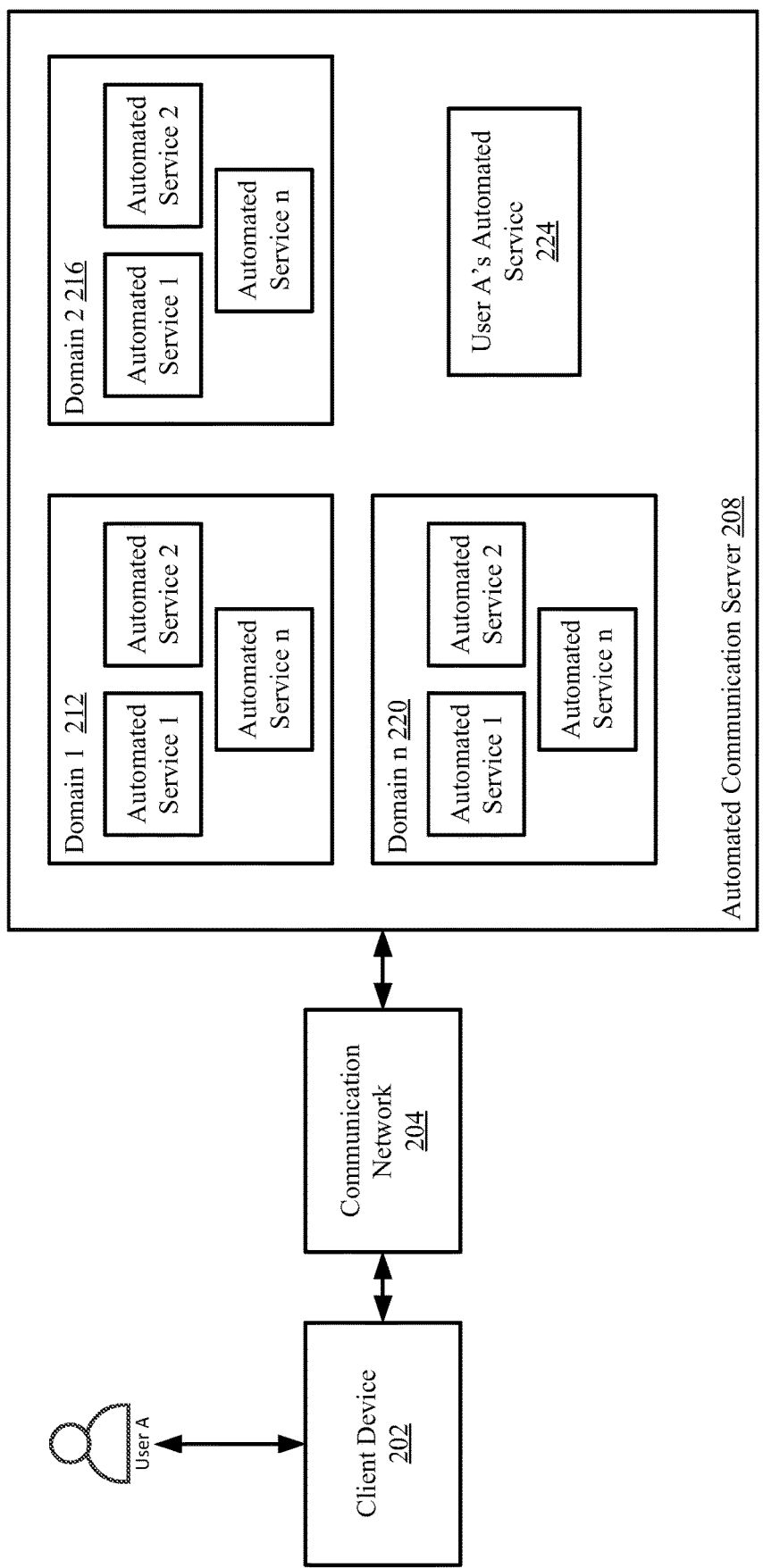
FIG. 2 illustrates an example block diagram representing an automated communication system 200 configured to provide automated communications between a user and a domain according to aspects of the present disclosure.

FIG. 2 illustrates an example block diagram representing an automated communication system 200 configured to provide automated communications between a user and a domain according to aspects of the present disclosure. Automated communication system 200 may include an automated communication server 208 configured to operate as an ad-hoc communication interface between one or more client devices and one or more domains. Client devices may connect to domains to resolve a particular intent of the client device (and/or a user thereof). Some interactions (e.g., communications, etc.) with domains may be automated to reduce time and/or resources consumed to resolve the particular intent. For example, an automated menu service may be used to automatically route communications received from client devices to particular agent devices configured to resolve an intent. When a client device (e.g., such as client device 202) connects to domain 204, domain 204 may connect to automated communication server 208 to establish a connection between the client device and an automated service configured to automate communications with the client device on behalf of the domain.

Automated services may be configured to automate services provided by a domain over a particular communication channel and communicate with client device 202 on behalf of the domain. For example, an automated service may be configured to parse a first communication from client device 202 including "What are your store hours?" and generate an automated response of "We open at 9:00 AM and close at 10:00 PM". The response may be tailored to one or more characteristics of client device 202 and/or user A, the first communication, the connection between client device 202 and domain 204, the domain 204, and/or the like. For example, if the client device is communicating with the automated service over email, then the automated response may be formatted for email. If the client device is communicating over a voice channel, then the communication may be translated from text into speech and spoken to the client device over the voice channel.

Automated communication server 208 may generate, maintain, and execute automated services on behalf of one or more domains. For example, automated communication server 208 includes a set of automated services (e.g., referred to as bots) for a domain 1 212, a set of automated services for a domain 2 216, a set of automated services for a domain n 220, etc. In some instances, the automated services of a particular domain may be generic such that each automated service of the particular may be configured to resolve any intent associated with any client device connecting to the domain. In other instances, automated communication server 208 may include generic and/or specialized automated services for a particular domain. In those instances, automated communication server 208 may identify a intent of a client device in connecting to a particular domain and connect the client device to a generic and/or particular specialized automated service corresponding to the particular domain that is configured to resolve the identified intent.

In still yet other instances, automated communication server 208 may include personal automated services (e.g., personal virtual agents, etc.) generated for individual users. Personal automated services may be generated, maintained, and executed based on information associated with a particular user to tailor communications in form and/or substance to that particular user. The information may include information received and/or generated by each domain that may provide access to a personal automated service (through automated communication server 208), information received and/or generated by automated communication server 208, and/or information received and/or generated by one or more other devices (e.g., client device 202, other servers, other databases, other services, etc.). For example, the information can include characteristics of a previous instance in which client device 202 connected to a particular domain to resolve an intent of the user operated client device 202. The information may be useable to tailor communications to the particular user. For example, the personal automated service may generate an automated communication references the previous instance the client device 202 connected to the particular domain (e.g., by requesting feedback regarding the resolution to the previous instance the client device 202 connected to the particular domain, etc.). The information may be stored by the domain and accessible to the personal automated service. Alternatively, the information may be stored and/or copied by automated communication server 208 such that the information is local to the personal automated service.

Personal automated services may be used to communicate with the particular user across multiple domains. For example, a particular user connected to a first domain, may be connected to a same personal automated service when connected to a second domain. As shown, automated communication server 208 includes set of generic and/or specialized automated services for each of domain 1 212, domain 2 216, domain 2, 220, etc. and a personal automated service for user A (and one or more other personal automated services for one or more other users, not shown). The personal virtual agent may leverage information received and/or generated from one domain regarding a particular client device when communicating with the particular client device regarding another domain. For example, a user may connect to a first domain and interact with the personal automated service to acquire tickets to visit a particular destination. The user may then connect to a second domain and interact with the personal automated service, which may use information regarding the particular destination to tailor communications to the user and/or to resolve an intent of the user. For example, the user may connect to the second domain for hotel accommodations.

Personal automated services may be configured to reduce time and/or effort needed to provide services to the particular user. Personal automated services may have access to information associated with the particular user that the personal automated service was generated for, information associated with previous interacts between the particular user and each domain within which the personal automated service is configured to operate, information associated with each domain within which the personal automated service is configured to operate, and/or the like. The information may be used to prepopulate fields needed to execute certain services. For example, if a communication is received requesting particular information for which additional information may be needed to provide the particular information, the information accessible to the personal automated service may be accessed to determine if any of the additional information is already known. If so, the user need not be bothered with requests for additional information. In some instances, the user may be asked to verify the additional information to ensure that the additional information is correct.

Automated communication server 208 may include an automated service hierarchy and connect a particular user to an automated service based on the hierarchy. Automated communication server 208 may first attempt to connect a particular user to a personal automated service. If no such personal automated service exists (or if the connection fails), automated communication server 208 may attempt to connect the particular user to a specialized automated service of a particular domain (e.g., the domain that the particular user initially connected to). If no such specialized automated service exists (or if the connection fails), automated communication server 208 may attempt to connect the particular user to a generic automated service of the particular domain. If no such generic automated service exists (or if the connection fails), automated communication server 208 may attempt to connect the particular user to another generic automated service or cause the particular user to be connected to an agent of the domain.

In an illustrative example, client device 202 (e.g., operated by user A) may connect to a particular domain 204 query domain 204 for information. Domain 204 may connect to automated communication server 208 and request an automated service to execute the query and communicate the response to client device 202. The request may include an identification of particular domain 204, an identification client device 202 and/or user A, an identification of the intent of client device 202 (e.g., to execute a query), and/or the like. Automated communication server 208 may use the information in the request to identify an automated service to communicate with client device 202 or user A. automated communication server 208 may identify the personal automated service that corresponds to user A (e.g., User A's automated service 224) and connect automated service 224 to the connection between client device 202 and the particular domain 204. If automated communication server 208 does not have a personal automated service for user A, then automated communication server 208 may identify an available automated service of the particular domain (e.g., domain 1 212) and connect an automated service from domain 1 212 to the connection between client device 202 and the particular domain 204.

Figure 3A:
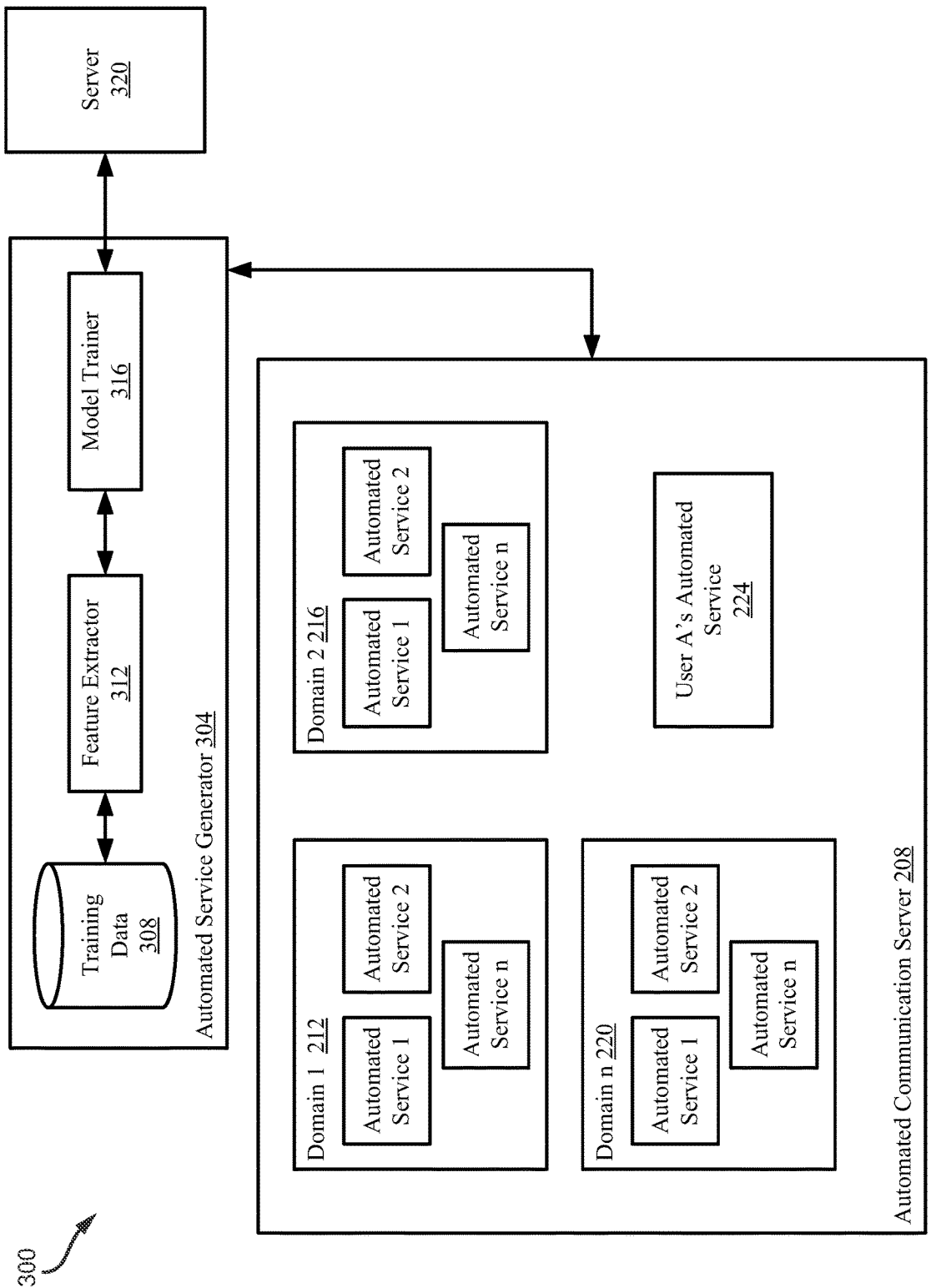
FIG. 3A illustrates an example block diagram representing an automated communication system configured to generate, maintain, and execute virtual agents capable of managing communicating between a user and a domain according to aspects of the present disclosure.

FIG. 3A illustrates an example block diagram representing an automated communication system configured to generate, maintain, and execute virtual agents capable of managing communicating between a user and a domain according to aspects of the present disclosure. Automated communication system 300 may provide virtual agents configured to communicate with a user on behalf of a domain. In some instances, virtual agents may communicate with the user in a manner that mimics a human agent such that the user may not know that they are communicating with an automated service. Automated communication service 208 may include a set of virtual agents (e.g., also referred to as automated services or bots) for each of domain 1 212, domain 2 216, domain n 220, etc. Automated communication server 208 may also include one or more personal virtual agents that are virtual agents generated for communicating with a specific user. Automated communication server 208 may connect the specific user to the personal virtual agent whenever the specific user connects to a domain registered with automated communication service 208 to provide personalized communication services to the specific user.

Automated service generator 304 may include one or more devices and/or components configured to generate new virtual agents. Automated service generator 304 may be remote from automated communication server 208. Alternatively, automated service generator 304 may be a component of automated communication server 208. Automated service generator 304 may receive a request to generate a new virtual agent from automated communication service 208, a user, a domain, one or more other devices, and/or the like. The request may include an identification of a type of virtual agent to be generated (e.g., such as a training virtual agent, a generic virtual agent, a specialized virtual agent, a personal virtual agent, and/or the like), an identification of a domain (if the virtual agent is to be generated for a particular domain), an identification of a particular user (if a personal virtual agent is to be generated for the particular user, and/or the like. Automated service generator 304 may define a new virtual agent based on the request. In some instances, the new virtual agent may be stored in a memory of automated service generator 304. In other instances, the new virtual agent may be received from server 320.

Virtual agents may include one or more machine-learning models that may receive a feature vector corresponding to one or more user communications as input and output a response that can be communicated back to the user. In some instances, the one or more machine-learning models may be configured to predict a response from a particular input. Automated communication service 208 and/or the domain may operate other machine-learning models configured to parse the input communication into a format that the one or more machine-learning models of the virtual agent can process and other machine-learning models to translate the output from the one or more machine-learning models of the virtual agent into a communication that the user may understand. For example, the one or more other machine-learning models may be include, but are not limited to, one or more machine-learning models configured to pre-process user communications in a first format (e.g., such as, but not limited to, audio, gesture, text, etc.) into a generalized format for a natural language processor, one or more machine-learning models configured to parse natural language communications into a format that can be processed by the virtual agent, one or more natural language machine-learning models configured to translate the output of the virtual agent into a natural language response understandable by the user (e.g., such as a large language model, classifier, generative adversarial network, etc.), one or more machine-learning models configured to post-process natural language responses into form/format receivable by the user (e.g., in a same format as the first format, a format selected by the user, a format selected by the virtual agent, a format determined based on a receiving device, etc.). The other machine-learning models may be packaged into a communication interface positioned between the virtual agent and the user. In other instances, the virtual agent may include the functionality of the other machine-learning models such that the virtual agent may be a complete automated service configured to communicate with users.

Automated service generator 304 may store training data in training data 308 database. The training data may be received from automated communication server 208, server 320, one or more domains associated with the new virtual agent (e.g., such as those domains registered with automated communication server 208 for personal virtual agents, a domain that the new virtual agent will communicate on behalf of, and/or the like), the user, one or more remote devices, and/or the like. The training data may be segmented based on a type of virtual agent being generated. For personal virtual agent, the training data may include user information (e.g., demographic information and/or any information received and/or derived by one or more domains, automated communication server 208, server 320, the particular user for which the personal virtual agent is to be generated, social media, and/or the like), historical communications between the particular user and one or more domains, historical communications of similar users (e.g., based on having one or more common characteristics, etc.) and one or more domains, information associated with the one or more domains registered with automated communication server 208, information associated with devices operated by the particular user (e.g., such as, but not limited to, device characteristics, IP addresses, media access control, hardware components of the device, software installed and/or in use by the device, a geographical location of the device, historical geographical locations of the device, communications protocols usable by the device, historical communications protocols used by the device, communication capabilities of the device, etc.), and/or the like.

For non-personal virtual agents, the training data may include historical communications between users and a particular domain for which the new virtual agent is being generated, information associated with the domain (e.g., agent devices and characteristics thereof operated by the domain enable communications between agents and users, an identification and characteristics of servers and/or databases operated by the domain, communication capabilities of the domain, preferred communication protocols usable by the domain, one or more characteristics of the domain usable as benchmarks which the virtual agent may be trained to increase or decrease, geographic information associated with where the domain operates, languages used by the domain and/or users who access the domain, and/or the like), historical communications between users and a similar domains (e.g., based on common characteristics, etc.), and/or the like.

The training data stored in training data 308 may include historical data (e.g., as previously described), manually generated data (e.g., data generated by a user that will communication with virtual agent, an agent of a domain, an administrator of automated service generator 304 and/or server 320, and/or the like), procedurally generated (e.g., automatically generated data generated from one or more random number generators), and/or the like. In some instances, automated service generator 304 may determine if the quantity of historical data is greater than a threshold quantity (e.g., such that the historical data alone may be used to train the new virtual agent). If not, automated service generator 304 may use some manually and/or procedurally generated data to define a training dataset usable to train the machine-learning models of the new virtual agent.

Feature extractor 312 may define feature vectors from the training data usable to train the machine-learning models included in the virtual agent. Feature extractor 312 may tailor the feature vector generated based on the type of machine-learning model being trained, the type of output excepted from the machine-learning model, the type of training being used (e.g., supervised, unsupervised, reinforcement, etc.), etc. In some instances, feature extractor may pre-process training data 308 to reduce a quantity of data in training data 308 (e.g., using dimensionality reduction algorithms such as principal component analysis, feature selection, etc.), derive additional features from those in training data 308, and/or the like. For example, during training of a personal virtual agent for a particular user, if training data 308 includes a large quantity of historical communications between users and a domain and few historical communications between a particular user and the domain, feature extractor 312 may define process the historical communications between users and the domain to extract features usable to train the personal virtual agent for the particular user.

Feature extractor 312 may pass each feature vector to model trainer 316, which may train the machine-learning models of the new virtual agent. Model trainer 316 track one or more accuracy metrics of each machine-learning model to determine when the machine-learning model has been trained (or if the model has to be trained). Examples of accuracy metrics usable by model trainer 316 include, but are not limited to, accuracy metrics include, but are not limited to, accuracy, recall, F1 score, confusion matric, logarithmic loss, mean absolute error, mean squared error, area under the curve (ROC), and/or the like. Model trainer 316 may include one or more thresholds for each accuracy metric. The one or more thresholds may be defined based on a type of machine-learning model being trained, user input, input from server 320, input from automated communication server 208, and/or the like Model trainer 316 may determine that a machine-learning model is ready for use when at least one accuracy metric exceeds the corresponding threshold. The at least one accuracy metric may be selected based on a type of machine-learning model being trained, user input, input from server 320, input from automated communication server 208, values of one or more other accuracy metrics, type of virtual agent being generated, quantity or quality of the training data, and/or the like.

Once the machine-learning models of the new virtual agent are trained, automated service generator 304 may package the new virtual agent for transmission to the requesting device (e.g., automated communication server 208, a domain that request the new virtual agent, server 320, a client device operated by a user, and/or the like).

The new virtual agent may be continuously adjusted during operation of the new virtual agent. Each interaction between a user and the new virtual agent may be scored using another virtual agent, the user (e.g., via feedback and/or based on subsequent communications, etc.), the domain (e.g., by an agent, agent device, virtual agent of the domain, and/or the like), user input, one or more remote devices, and/or the like. The score may be used to execute a reinforcement learning training iteration. Automated communication server 208, the domain, the user or client device, server 320, or the like, may transmit information associated with an interaction or characteristics of an interaction between the client device and/or user thereof and the new virtual agent to automated service generator 304. Feature extractor 312 may generate a feature vector using the information associated with an interaction or characteristics of an interaction, the score, and the original input to the new virtual agent that produced the responses during the interaction with the client device or user thereof. The feature vector may be passed to model trainer 316, which may perform a reinforcement learning training iteration to adjust the internal characteristics of the new virtual agent, which may improve subsequent responses generated by the new virtual agent.

In some instances, a reinforcement learning training iteration may be performed after each interaction with the client device and/or user thereof. In other instances, a reinforcement learning training iteration may be performed each time the score is less than a threshold score. In still yet other instances, a reinforcement learning training iteration may be performed in regular intervals based on time and/or instances of interaction with the client device and/or the user thereof.

Figure 3B:
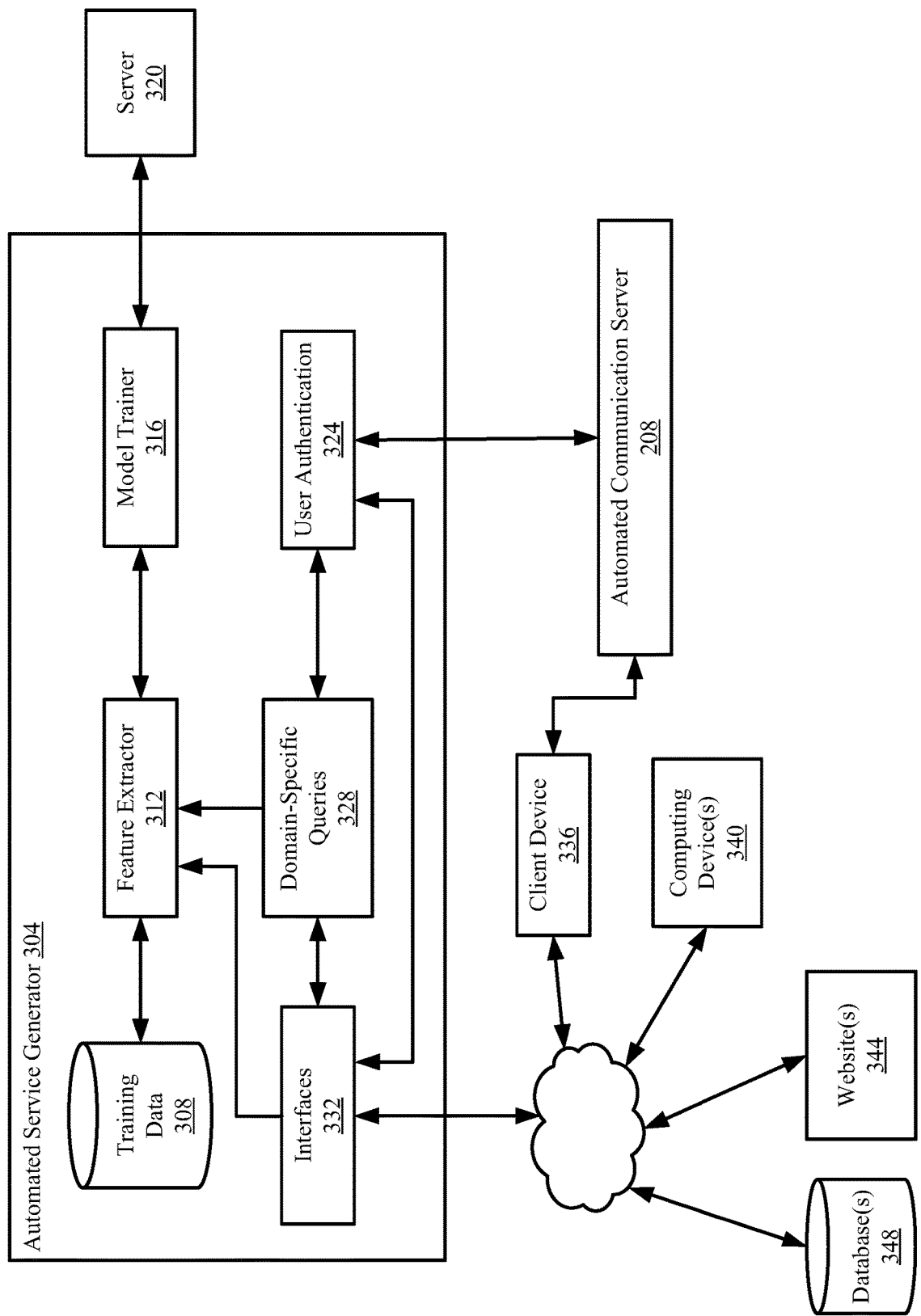
FIG. 3B illustrates an example block diagram representing an automated communication system configured to generate, maintain, and execute virtual agents for newly registered users according to aspects of the present disclosure.

FIG. 3B illustrates an example block diagram representing an automated communication system configured to generate, maintain, and execute virtual agents for newly registered users according to aspects of the present disclosure. In some instances, a client device (e.g., such as client device 336 or other device, etc.) or user can request generation of a personal virtual agent associated with one or more domains without using historical data of the domain. For example, client device 336 may request a personal virtual agent before communicating with a particular domain or if there are insufficient interactions between client device 336 and the domain to train a personal virtual agent. Client device 336 may register with automated communication server 208 to establish a user profile. Automated communication server 208 may then request generation of one or more personal virtual agents for one or more domains using information provided by client device 336 and/or from information sources identified by client device 336. The information may be used by automated service generator 304 to train personal virtual agents for client device 336. The generated personal virtual agents may be stored in associated with the user profile so that client device 336 can access the personal virtual agents during subsequent communication sessions with automated communication server 208 and/or domains may access the generated personal virtual agents when client device 336 or the user thereof establishes a communication with a corresponding domain.

Client device 336 or another device operated by a same user may establish a connection automated communication server 208 (e.g., using an application, a webpage, a telephone for audio-based communications, service, etc.). Client device 336 or the user thereof may request a new personal virtual agent. Automated communication server 208 may determine whether client device 336 or the user thereof is already registered with automated communication server 208 or automated service generator by determining if the user information is associated with an existing user profile. For example, client device 336 and/or the user thereof may provide user information usable to identify client device 336 and/or the user thereof (e.g., such as, but not limited to, a name or identifier, username/password, email address, user profile identifier, demographic information, characteristics of the user, characteristics of client device 336 such as hardware information or software information, network information such as media access control address or Internet Protocol address, combinations thereof, or the like). Automated communication server 208 may pass the information to user authentication 324.

User authentication 324 may determine whether the client device or user thereof has previously registered with automated communication server 208 or automated service generator 304 by comparing the user information with user profiles stored by automated service generator 304 or automated communication server 208. For example, user authentication 324 may determine if any of the information associated with the client devices corresponds to any existing user profiles. If user authentication 324 determines that the client device and/or the user thereof has already registered with automated communication server 208 or automated service generator 304, then user authentication 324 may access the user profile associated with the user information and return a user profile identifier to automated communication server 208. Automated communication server 208 may then transmit a communication to client device 336 and/or the user thereof with the user profile identifier to enable client device 336 and/or the user thereof the ability to access personal virtual agents associated with client device 336 and/or the user thereof.

If user authentication 324 determines that client device 336 and/or the user thereof is not associated with an existing user profile, then user authentication 324 may generate a new user profile for the user of client device 336. The user profile may include any of the aforementioned user information. The user profile may also include an identification of each device used to access automated communication server 208 or a domain serviced by automated communication session 208, device information associated with each device (e.g., an identification a device type, an identification of hardware components of the device, an identification of software installed on the device, processing and/or communication capabilities of the device, device identifier, network identifiers, combinations thereof, or the like), personal virtual agents generated for the user, domains for which personal virtual agents have been generated, etc. The user profile may initially include only the information provided by client device 336 and/or the user thereof to determine if an existing user profile already exists. As client device 336 and/or the user thereof communicates with automated communication server 208 and/or automated service generator 304 more information about the user may be received and stored in the user profile.

The new user profile may be passed to domain-specific queries 328. Domain-specific queries 328 may define a set of queries to obtain information usable to train the requested personal virtual agent. The queries may include requests for information from information sources as well as requests for information form the user. The domain-specific queries may be statically defined (e.g., for each domain by a user of automated communication server 208 or automated service generator 304 or automatically based on characteristics of the domain or personal virtual agent to be generated, etc.) or dynamically defined. Dynamically defined queries may be generated a runtime (e.g., when the communication request is received) and include a sequence of queries generated for client device 336 and/or the user thereof based on the information stored in the new user profile, the personal virtual agent requested, the domain for which the requested personal virtual agent is to operate, and/or the like. Examples of information requested by domain-specific queries 328 include, but are not limited to, characteristics of client device 336 (e.g., such as hardware components or software installed on client device 336, media access control address, Internet Protocol address, a location of client device 336, a device type, combinations thereof, or the like etc.), characteristics of the user (e.g., such as physical characteristics, demographic information, location information, interests of the user, socioeconomic status, etc.), type of virtual agent requested, characteristics of the domain, an identification of information sources associated with client device 336 or the user thereof (e.g., such as, but not limited to, social media accounts, websites that may store or have access to information associated with the client device or the user thereof, databases, other devices associated with the client device and/or the user thereof, combinations thereof, or the like), access credentials and/or application programming interfaces associated with the information sources, combinations thereof, or the like. Domain-specific queries 328 may use any information stored in or derived from the new user profile to generate queries so as to obtain a requisite quantity and type of information usable to train a personal virtual agent.

Interfaces 332 may include one or more interfaces (e.g., network interfaces, application programming interfaces, input/output interfaces, etc.) configured to enable communications with external devices such as, but not limited to, client device 336, other computing devices 340 associated with client device 336, websites 344 (e.g., social media, other websites associated with the client device 336, etc.) databases 348, one or more domains, or any other information source identified by client device 336 or the user thereof. Automated service generator 304 may transmit the queries defined by domain-specific queries 328 to information sources 336-348 via interface 332. In some instances, the queries may be automatically executed. For instance, a query may be defined using structured query language (SQL) schema to automatically obtain information from a database. One or more APIs (of interfaces 332) may be used to translate queries of domain-specific queries 328 into native code of a corresponding information source to automatically obtain requested information. The executable code may obtain specific information (e.g., such as store hours, names, etc.) or may be configured to obtain any information associated with client device 336 or the user thereof (e.g., such as using a web crawler, database crawler, etc.).

Some queries may be executed by manually or semi-manually. For example, a query may be transmitted to client device 336 over one or more communication channels (e.g., email, telephone, text messaging, instant messaging, a proprietary communication protocol, etc.). Upon being received by client device 336, the user thereof may manually provide the information that may satisfy the query and transmit the information to automated service generator 304 via interfaces 332 using the same or a different communication channel. Examples of queries that may be transmitted to client device 336 may include, but is not limited to, information associated with client device 336 and/or the user thereof, one or more domains if the personal virtual agent is to be trained for a particular one or more domains, user interests, user intents, an identification of an intended purpose of the personal virtual agent, an identification of information sources, or the like.

Interfaces 332 may pass responses received from information sources 136-148, information obtained from the domain (e.g., historical data from previous interactions between user device 336 or the user thereof and the domain if any), information from the user profile, combinations thereof, or the like to feature extractor 312. Feature extractor 312 may generate training data usable to train a personal virtual agent client device 136 and/or the user thereof. If feature extractor 312 determines there is insufficient information to train a personal virtual agent, then automated service generator 304 may generate additional queries using domain-specific queries.

The training data may be used to train a new personal virtual agent (as previously described). The automated service generator 304 may generate an identifier that uniquely identifies the new personal virtual agent (e.g., a universally unique identifier (UUID), or the like). For example, the identifier may be generated using a hash function on one or more features extracted from the user profile and an identification of the domain for which the new personal virtual agent is trained. The new personal virtual agent is trained for the user (e.g., regardless of any particular domain), the identification of the domain may be set to "independent". The combination of domain and user profile features enable generating a unique identifier for the new personal virtual agent. The identifier may be stored in the user profile. The identifier may also be stored in a database of personal virtual agents stored in automated service generator 304 or automated communication server 208.

The new personal virtual agent may be stored within memory associated with automated communication server 208 or automated service generator 304, memory of the domain for which the personal virtual agent was trained, memory of client device 336 or another device associated with the user, a cloud network, or the like. Once trained, the personal virtual agent may be accessed when the client device 336 or the user thereof establishes a connection with domain for which the personal virtual agent was trained. The personal virtual agent may communicate with the client device 336 or the user thereof on behalf of the domain to enable personalized communications between the user and the domain. As the user communicates with the personal virtual agent, interaction data may be generated (by the personal virtual agent and/or by the domain, etc.). The interaction data may be used to add additional features to the user profile and/or to train the personal virtual agent (e.g., using reinforcement learning, semi-supervised learning, self-supervised learning, etc.) to further improve the communication capabilities of the personal virtual agent and the ability of the personal virtual agent to provide services of the domain to the user.

Figure 4A:
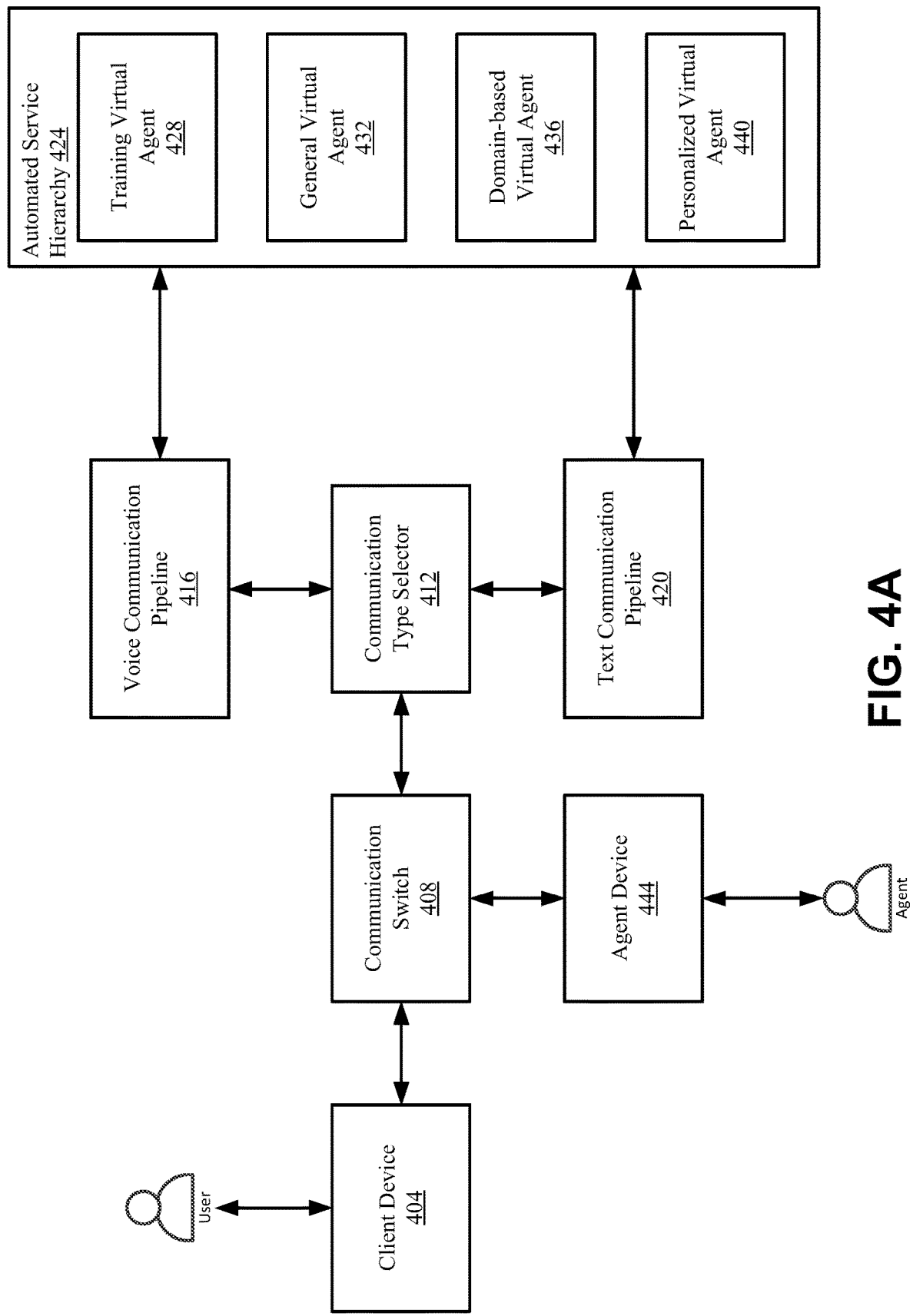
FIG. 4A illustrates a block diagram of an example system for automating communications between a user and a domain according to aspects of the present disclosure.

FIG. 4A illustrates a block diagram of an example system for automating communications between a user and a domain according to aspects of the present disclosure. Client device 404 (operated by a user) may connect to a domain to request resolution of an intent of the user (e.g., to execute query, provide information to the domain, provide resources to the domain, return an object, etc.). The domain may include communication switch 408 configured to manage the connection between client device 404 and the domain. The domain may use communication switch to route communications received from client device 404 to one or more devices configured to resolve the intent. In some instances, the domain may operate communication switch 408 to initially route communications to a virtual agent. If the virtual agent is unable to resolve the intent of the user, fails (e.g., due to software and/or hardware errors, faults, interrupts, etc.), and/or is unable to communicate with client device 404, then communication switch 408 may reroute communications to an agent. In other instances, the user may indicate whether to communicate with a virtual agent or an agent. In still yet other instances, the determination whether to route communications to a virtual agent or an agent may be determined by a type of intent of the user to be resolved, a likelihood that the intent can be resolved by a virtual agent, a difference in the predicted quantity of resources consumed (e.g., processing resources, time, etc.) having a virtual agent resolve the intent vs the agent, types and/or quantities of virtual agents available to client device 404, quantity of agents available to resolve the intent, scores associated with the available virtual agents, scores associated with the available agents, and/or the like.

When the domain determines to route communications to a virtual agent, the domain may cause communication switch 408 to transmit a request to communication type selector 412 to configure communication interfaces for the virtual agent. Communication type selector 412 may operate one or more communication interfaces based on communication capabilities of the virtual agent and/or client device 404. For example, if client device 404 establish a voice channel connection with the domain, then communications between client device 404 and domain may be limited to sound-based communications. Communication type selector 412 may configure one or more communication interfaces configured to process sound-based communications transmitted to or from client device 404. Communication type selector 412 may use one or more factors to determine which communications to configure for a particular connection with a client device. Examples of such factors include, but are not limited, type of connection established between client device 404 and domain (e.g., voice, alphanumeric text, data, email, direct messaging, instant messaging, etc.), a language being used by the user, a geographic location of the domain, a geographic location of client device 404 and/or the user thereof, communication capabilities of client device 404 and/or the user thereof, limitations of the user (e.g., such as any disabilities that may limit or prohibit certain types of communication, etc.).

If communication type selector 412 determines that communications interfaces for sound-based communications are needed, then communication type selector 412 may configure one or more communication interfaces for sound-based communications using voice communication pipeline 416. Voice communication pipeline 416 may include a classifier configured to identify a language being used, a first set of communication interfaces configured to parse sound-based communications in the identified language into a format that a virtual agent can process and a second set of communications interfaces configured to translate the output from the virtual agent into a sound-based communication that client device 404 can receive over the sound-based communication channel. The communication interfaces may include one or more machine-learning models configured to process sound-based communications such as a voice-to-text machine-learning model, natural-language machine-learning models, and/or the like. The classifier may be a machine-learning model such as, but not limited to, a neural network, recurrent neural network, support vector machine, K-means, random forest, regression-based model, and/or the like. Voice-to-text machine-learning models may include a neural network, recurrent neural network (e.g., such as a long-short term memory, continuous-time recurrent neural network, etc.), hidden Markov models, feedforward neural networks, and/or the like. The natural language machine-learning model may include a neural network, a recurrent neural network, deep learning networks, and/or the like. In some instances, the voice-to-text machine-learning model and the natural-language machine-learning models may be combined into an ensemble model.

In some instances, the communication interfaces may include one or more natural language machine-learning models. The particular natural language machine-learning model to be used to parse incoming or outgoing communications and/or translate output from the virtual agents may be determined based on the language identified by the classifier. The particular natural language machine-learning model may be selected based on an ability of that natural language machine-learning model to parse and/or generate communications in the identified language.

If communication type selector 412 determines that communications interfaces for data-based communications are needed, then communication type selector 412 may configure one or more communication interfaces for data-based communications using text communication pipeline 420. Text communication pipeline 416 may include a classifier configured to identify a protocol an incoming communication (e.g., form, format, syntax, language, etc.), a first set of communication interfaces configured to parse the incoming communication into a format that the virtual agent can process, and a second set of communications interfaces configured to translate communications from the virtual agent into a text-based communication that client device 404 can receive and process. The classifier may be a machine-learning model such as, but not limited to, a neural network, recurrent neural network, support vector machine, K-means, random forest, regression-based model, and/or the like. The natural language machine-learning model may include a neural network, a recurrent neural network, deep learning networks, and/or the like.

In some instances, the communication interfaces may include one or more natural language machine-learning models. The particular natural language machine-learning model to be used to parse incoming or outgoing communications and/or translate output from the virtual agents may be determined based on the protocol identified by the classifier. For example, the classifier may identify the protocol being used by client device 404 as alphanumeric text over direct messaging in the English language. English alphanumeric text in direct messaging may use different sentence structure, punctuation, phrasing, abbreviations, etc. than other formats (e.g., text messaging, email, etc.) and/or other languages. The particular natural language machine-learning model may be selected based on an ability of that natural language machine-learning model to parse and/or generate English alphanumeric text particular to direct messaging.

The communication interface may output communications to a particular virtual agent selected to communicate with client device 404. In some instances, automated service hierarchy 424 may select a virtual agent for use in communicating with client device 404 based on a hierarchy of virtual agents. The hierarchy may include (from highest to lowest) personal virtual agent 440, domain-based virtual agent 436, and general virtual agent 432. For example, automated service hierarchy 424 may select personal virtual agent 440 if such a personal virtual agent has been generated for the particular user operating client device 404. If no such personal virtual agent exists, automated service hierarchy 424 may identify a domain-based virtual agent 436 that corresponds to the domain requesting use of a virtual agent. If no domain-specific virtual agents are available, then automated service hierarchy may identify a general virtual agent 432 to communicate with client device 404. In some instances, automated service hierarchy may select a training virtual agent 428. Training virtual agents may be used to automate communications for training purposes (e.g., to train agents, to generate training data to train other virtual agents, to train the user, and/or the like).

The response generated by each virtual agent of automated service hierarchy 424 may be different. For example, personal virtual agents may tailor responses based on the particular user for which the personal virtual agent was generated. The response may include information associated with previous instances the particular user interacted with the personal virtual agent, domain, or the like. For example, if the user previously connected to a domain to discuss a faulty object, the personal virtual may generate communications asking about the object, the resolution of the previous connection, whether the current intent of the user is related to the previous connection, and/or any other detail or communication provided during the previous connection to ensure that the user's intent was resolved satisfactorily. If the current intent of the user is related to the previous connection, the personal virtual agent may obtain further information related to the previous connection to provide additional assistance (and to avoid asking for information previously provided by the user, providing resolutions previously provided during the previous connection, etc.).

Personal virtual agents may access historical communications of other users that have connected to one or more domains associated with automated service hierarchy 424. The historical communications may be used to improve a likelihood of resolving the intent of the user. For example, once the intent of the user is identified, the personal virtual agent may identify a previous communication associated with a same intent that was resolved successfully. The personal virtual agent may then respond in a similar manner as done in the historical communications to resolve the intent of the user.

Domain-based virtual agents may be configured to resolve user intents associated with the particular domain for which the domain-based virtual agent was generated. Domain-based virtual agents may be generated for a particular domain and only communicate with client device connected to the particular domain. Domain-based virtual agents may use historical communications other users and the domain (as previously described). General virtual agents may be configured to resolve basic intents associated with a single domain or multiple domains. General virtual agents may have limited access to information of any particular domain, which may limit the types of responses and/or resolutions that the general virtual agents may provide.

Communications received from client device 404 may be processed by the communication interfaces configured by communication type selector 412 (e.g., voice communication pipeline 416 or text communication pipeline 420) and passed to a selected virtual agent. The selected virtual agent may process the communications to generate an output. The output may be passed to the same communication interface that processed the received communications, which may convert the output into natural language a natural language communication and, in the case of sound-based communication, translate the natural language communication into a sound-based communication (e.g., via a text-to-voice model) that may be received and understood by the user.

Figure 4B:
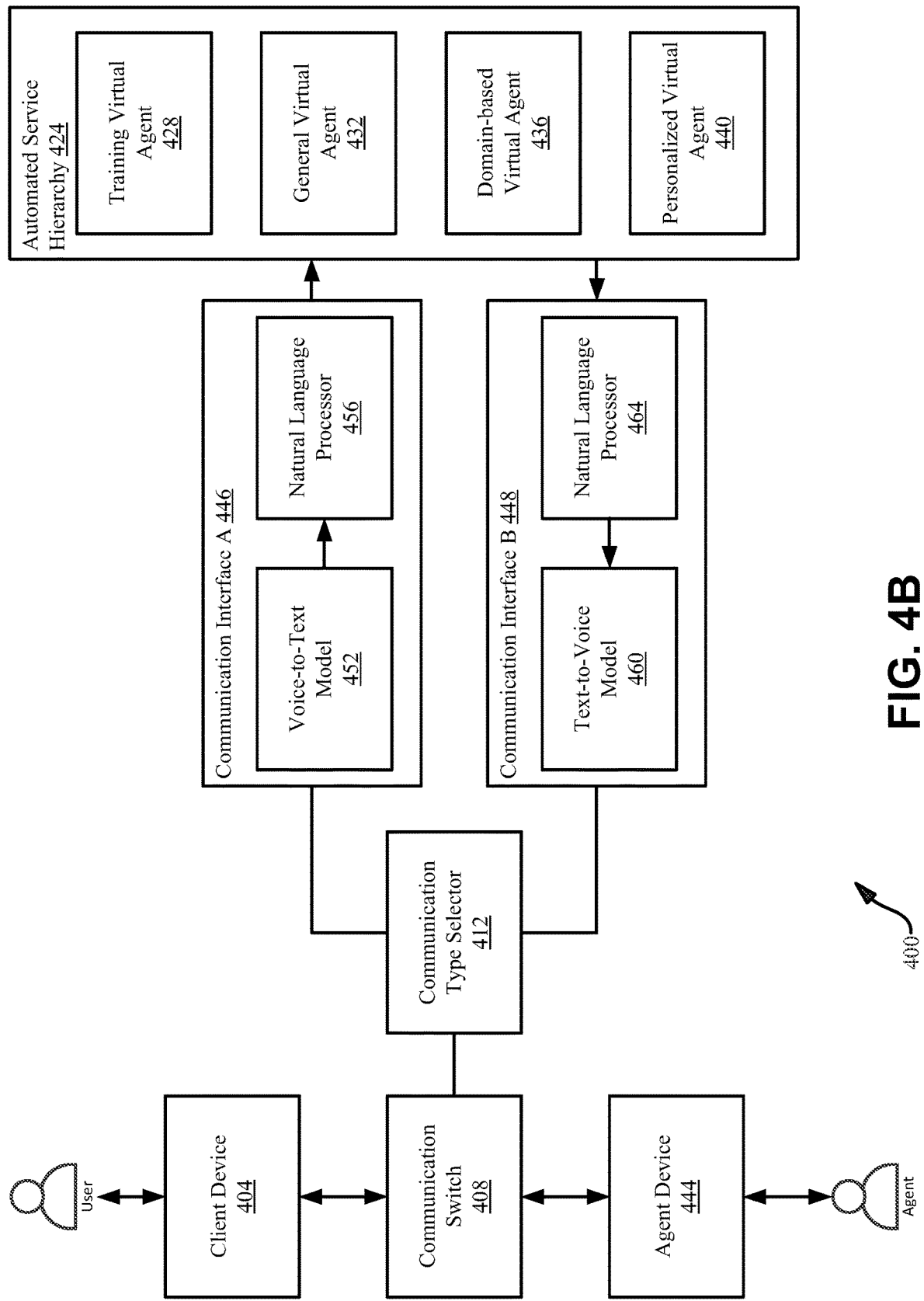
FIG. 4B illustrates a block diagram of example communication interfaces of a voice communication pipeline according to aspects of the present disclosure.

FIG. 4B illustrates a block diagram of example communication interfaces of a voice communication pipeline according to aspects of the present disclosure. Voice communication pipeline 416 may include a communication interface A 444 and communication interface B 448 that translate communications to and from a from and/or format of the virtual agent. Voice communication pipeline may enable virtual agents to operate across language and cultural boundaries by abstracting the content of communications into a unified format that a virtual agent can process. A same virtual agent may communicate with users from the United States and users from Germany using a language, dialect, idioms, etc. exclusive to the respective users.

Communication interface A 444 may receive communications from client device 404 (through communication switch 408, which determines whether communications are to be routed to an agent device or to a virtual agent and communication type selector 412, which routes communications to an appropriate communication pipeline configured to process those communications) and convert the communications into a format processable by a virtual agent. Communication interface 446 may include a voice-to-text machine learning model 452, configured to convert audio communications into a sequence of alphanumeric characters. In some instances, voice-to-text machine learning model 452 may also include a classifier configured to predict a language of the audio communication to improve the accuracy of voice-to-text machine learning model 452.

The sequence of alphanumeric characters may be passed to natural language processor 456, which may generate a machine-readable version of the alphanumeric text. Natural language processor 456 may include one or more machine-learning models configured to parse the alphanumeric text into a sequence of tokens (e.g., a set of alphanumeric characters that start after a space and end before the next space in the sequence of alphanumeric characters). The sequence of tokens may be reduced by eliminating certain tokens that have a low likelihood of contributing to an overall semantic meaning of the original communication such as articles (e.g., "a", "an", "the", etc.).

The one or more machine-learning models then determines the semantic relevancies of each token, the sequence of tokens, of subsequences of tokens within the sequence of tokens, and/or the like. Scores may be assigned to each semantic relevancy and those semantic relevancies having a highest score (or a score that is greater than a threshold) may be assigned to that token, to the sequence of tokens, to the subsequences of tokens within the sequence of tokens, and/or the like. The one or more machine-learning models may generate a new sequence of tokens that corresponds to a sequence of tokens that is semantically analogous to the initial sequence of tokens, but in a format of the virtual agent.

The output from natural language processor 456 may be passed to the selected virtual agent (e.g., as previously described). In some instances, personal virtual agent 440 may receive the initial sequence of tokens and the new sequence of tokens. Since personal virtual agent 440 is trained to communicate with a specific user, personal virtual agent 440 may include additional information corresponding to verbal communication idiosyncrasies of the particular user. personal virtual agent 440 may use both the initial sequence of tokens and the new sequence of tokens to increase an accuracy of responses generated by personal virtual agent 440. Alternatively, personal virtual agent 440 may receive only the initial sequence of tokens and derive a semantic meaning of the initial sequence of tokens. Alternatively still, personal virtual agent 440 may receive only the new sequence of tokens and process the personal virtual agent 440 in light of historical communications with the particular user to refine, alter, or maintain the of the new sequence of tokens.

The virtual agent may generate a response based on the new sequence of tokens received from communication interface A 446. The response may include a sequence of tokens in a format of the virtual agent. The response may be passed to communication interface B 448, which may translate the response into a form and/or format of the received communication. Communication interface B 448 may include natural language processor 464. Natural language processor 464 may include one or more machine-learning models configured to generate a natural language version of the sequence of tokens of the virtual agent. In some instances, personal virtual agent 440 may include a natural language processor 464 or a natural language processor 464 may be trained for exclusive use with a personal virtual agent 440 (with other virtual agents using a different natural language processor of communication interface B 448). Each user may communicate slightly differently using a particular language, diction, syntax, idioms, accents, grammar, pronunciation, etc. The natural language processor 464 of each personal virtual agent 440 may be configured to use the preferred language, diction, syntax, idioms, accents, grammar, pronunciation, etc. of the user of the personal virtual agent (e.g., the language, diction, syntax, idioms, accents, grammar, pronunciation, etc. used by the user, selected by the user, selected by the domain, selected by the personal virtual agent, etc.).

The natural language version of the sequence of tokens of the virtual agent may be passed to text-to-voice model 460, which may generate a sound-based communication from the natural language version of the sequence of tokens. Text-to-voice model 460 may be configured to simulate a communication characteristics (such as, but not limited to a particular language, diction, slang, phrases, syntax, grammar, voice pattern voice pattern (e.g., male or female voice, pitch, cadence, accent, pronunciation, etc.), and/or the like. In some instances, text-to-voice model 460 may use a voice pattern that corresponds to a geographic location of the client device 404 and/or the user thereof. In other instances, text-to-voice model 460 may use a voice pattern selected by the user, agent, domain, virtual agent, and/or the like. For example, personal virtual agent 440 may include a text-to-voice model 460 or use a particular text-to-voice model 460 that generates communications using a voice pattern selected by the user. Alternatively, the personal virtual agent may use a voice pattern determined to be preferred by the user based on historical communications with the user. Personal virtual agent 440 may generate a score of the output of text-to-voice model 460, which may cause text-to-voice model to vary the vocal pattern over time achieve a higher score (e.g., via reinforcement learning). Text-to-voice model 460 may continue to revise the voice pattern output until a particular score is achieved, which may correspond to a particular voice pattern preferred by the user.

If client device 404 is connected to virtual agent via a data channel, then communication type selector 412 may route communications through text communication pipeline 420. Text communication pipeline 420 may include an alternative version of communication interface A 446 and an alternative version of communication interface B 448. Since the alternative version of communication interface A 446 may operate on alphanumeric-based communications, a voice-to-text model may not needed. Instead, the alternative version of communication interface A 446 may include a classifier configured to identify characteristics of the received communications such as, but not limited to a language being used, a dialect of the language, an alphabet, a communication channel type (e.g., such as email, text messaging, instant messaging, direct messaging, etc.), and/or the like. The alternative version of communication interface A 446 may then select a natural language processor 456 configured to process the received communication into a format of the virtual agent.

The alternative version of communication interface B 448 may include natural language processor 464. Since communications may be transmitted an alphanumeric-based communications a text-to-voice model may not be needed. The natural language processor 464 may be selected based on the output from the classifier such that the natural language processor may generate natural language responses from the virtual agent configured to be understood by the user of client device 408. The natural language responses may be in a form and/or format based on the communication channel type (e.g., where the form or format may be different when using email versus using text messaging, etc.).

Figure 5:
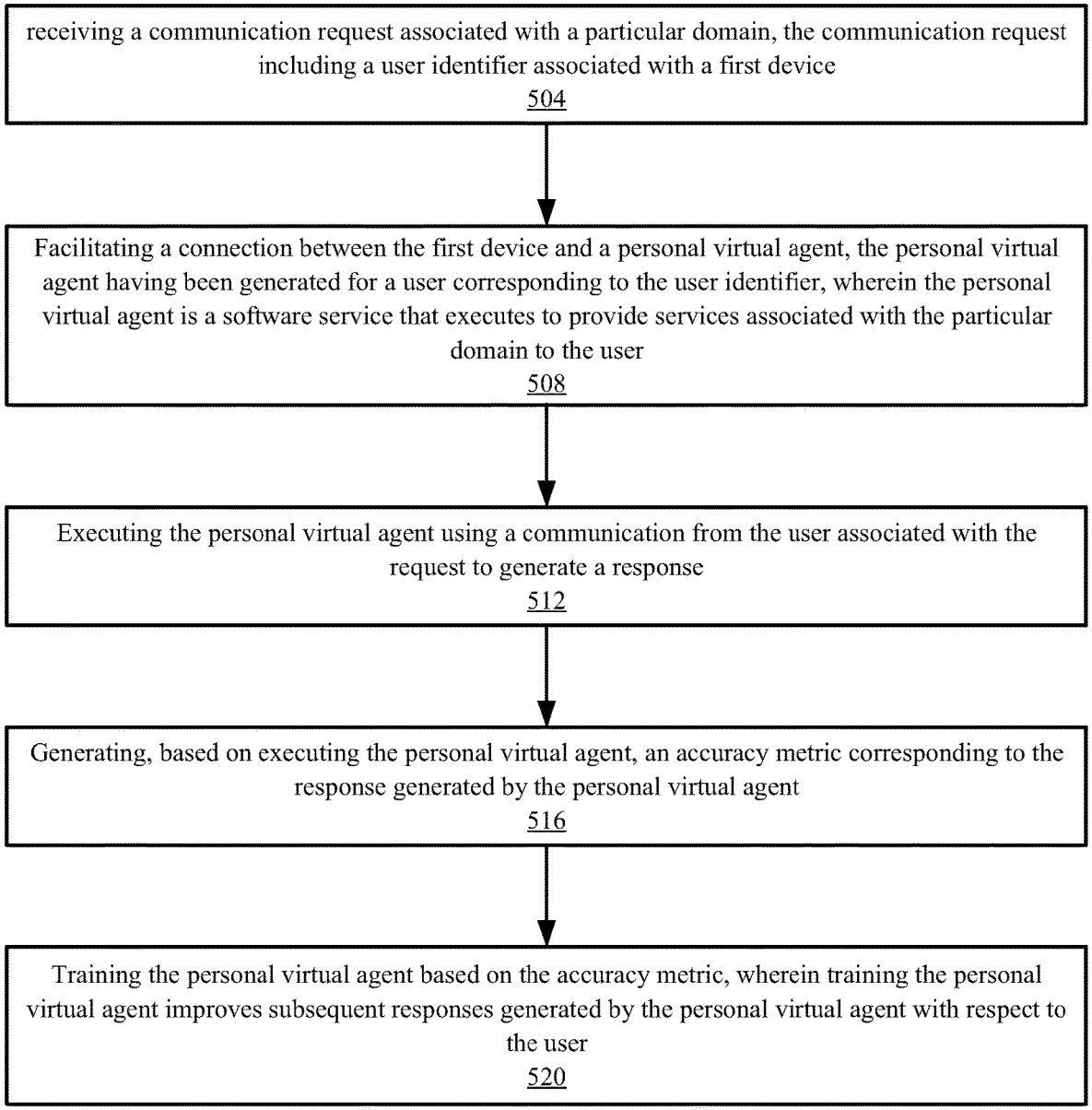
FIG. 5 illustrates a flowchart of example process for maintaining a personal virtual agent configured to automate communications with a particular client device according to aspects of the present disclosure.

FIG. 5 illustrates a flowchart of example process for maintaining a personal virtual agent configured to automate communications with a particular client device according to aspects of the present disclosure. At block 504, a computing device receives a communication request associated with an automated service. The computing device may operate a set of automated services for use in automating communications between a user (operating a first device) and a domain. The user may establish a connection with a device of the domain (e.g., via an IP network, a telephone network, etc.) to resolve a particular intent of the user. The communication request may include a communication from the user (e.g., and/or the first device) corresponding to an intent of the user (e.g., to access services of the domain, to request information associated with the domain, etc.). Alternatively, the communication request may include a request to establish a connection with the automated service.

The communication request may also include or be associated with a user identifier associated with the first device and/or user. The user identifier may include, but is not limited to, an identification of the first device, an identification of the user, an identification of intent of the user, an identification of the domain and/or the device through which the first device is connected to the domain, characteristics of the connection with the domain (e.g., IP address, media access control address, internet service provider providing a connection to the device, telephone number of the first device, available bandwidth, etc.), characteristics of the first device (e.g., an identification of hardware components and/or software components installed thereon, processing capabilities, etc.), demographic information associated with the user, other information associated with the user or intent of the user, and/or the like. The first device may be a computing device (e.g., such as a desktop computer, laptop computer, server, etc.), mobile device (e.g., such as a smartphone, personal digital assistant, tablet, etc.), thin client, and/or any other device configured to communicate with one or more remote devices).

In some instances, the computing device may identify the user from the communication request. For example, the computing device may match a telephone number of the first device to a telephone number in a database. The computing device may then associate the first device with the user identifier associated with the telephone number in the database. In another example, the computing device may use vocal patterns of communications in the communication request to identify the user. The computing device may sample communications in the communication request and use frequency analysis to generate one or more vocal patterns of the user. The one or more vocal patterns may then be compared to vocal patterns in the database to identify a user identifier of the user and/or the first device.

The communication request may be received from the device of the particular domain requesting an automated service to automate the resolution of the user's intent. Alternatively, the communication may be received from the first device requesting access to an automated service associated with the domain and configured to resolve the intent of the user. In that instance, the first device may connect directly to the computing device and the computing device may establish a connection with the device of the domain for the first device.

At block 508, the computing device may facilitate a connection between the first device and a personal virtual agent associated with the first device. The personal virtual agent may be an automated service generated and trained to communicate with the user that corresponds to the user identifier. Automated services may be implemented in hardware and/or software. In some instances, automated services may include one or more machine-learning models configured to process communications received from a user and generate a contextually relevant response. Personal virtual agents may be generated using data associated with a particular user and/or historical communications between the particular user and one or more domains. Personal virtual agents may be tailor response to the particular user (e.g., by using particular language, syntax, dialect, diction, phrasing, pronunciation, grammar, and/or the like; by generating responses using information associated with the user, historical communications with the user across multiple domains, user preferences, and/or the like; and/or the like). Automated services may provide services to domains by automating communications between a user and the domain. The automated service may provide services of the domain to users.

At block 512, the personal virtual agent may be executed based on a communication from the user (e.g., such as the communication within the communication request, a communication subsequent to establishing a connection with the personal virtual agent, etc.). The personal virtual agent may generate a response to the communication. The response to the communication may be in a natural language format (e.g., in alphanumeric text and/or sound-based verbal communication) or a machine-readable format (e.g., which may be translated into a natural format using a communication interface as previously described in connection to FIG. 4A and FIG. 4B). The personal virtual agent may include generate one or more predicted responses to a particular input with a corresponding confidence associated with each predicted response. The confidence may be indicative of an accuracy of the predicted response, a likelihood that the response will be acceptable to the particular user, and/or the like. The personal virtual agent may select the predicted response having a highest confidence as the response to the communication.

The computing device and/or the personal virtual agent may transmit a communication response to the first device. If the communication response is in machine-readable form, the communication response may be passed through a communication interface (as previously disclosed) to translate the communication into a form and/or format parsable by the first device and/or the user. For example, the communication interface may translate the communication response into a natural language response in an alphanumeric form (e.g., if the communication request was over an alphanumeric-based channel such as text messaging, email, direct messaging, instant messaging, etc.), audible form (e.g., if the communication request was over a sound-based channel such telephone, etc.) such as synthetic speech, and/or the like.

The personal virtual agent may resolve the intent of the user (e.g., such as providing information requested by the user, executing a transaction, etc.). For example, the intent may correspond to a request for particular information associated with a physical location of the domain (e.g., such as store hours for a domain location near the user). The personal virtual agent may use information previously received and/or derived that is associated with the user (e.g., such as a current or historical location of the user, etc.) and access a database of the domain to obtain the particular information. Alternatively, the personal virtual agent may access other information sources such as a website of the domain, a website hosting information associated with the domain, and/or the like. The personal virtual agent may then generate a communication response that include the request information. The personal virtual agent may use information associated with the user, historical interactions with the user, and/or the like to reduce a quantity of information needed from the user to satisfy the intent of the user.

In some instances, the personal virtual agent may not be able to resolve the intent of the user (e.g., missing information, software/hardware faults, user requests access to a different automated service or agent of the domain, domain restricts automated access to a particular service, etc.). In those instances, the personal virtual agent may establish a connection with an agent of the domain. Once the connection is established, the personal virtual agent may disconnect from the connection such that the connection is between the first device and the agent of the domain. Alternatively, the personal virtual agent may remain connected to the first device and monitor interactions between the user and the agent. If the agent is able to resolve the intent of the user, the interactions between the user and the agent may be used for reinforcement training of the personal virtual agent and/or other automated services such that the personal virtual agent may be more likely to resolve that intent in a subsequent interaction with the user.

At block 516, the computing device generates an accuracy metric corresponding to the response generated by the personal virtual agent. The accuracy metric may be based on one or more machine-learning accuracy metrics (accuracy, recall, F1 score, confusion matric, logarithmic loss, mean absolute error, mean squared error, area under the curve (ROC), and/or the like), user input (e.g., an indication from the particular user, an agent of the domain, or the like of an accuracy of the response), a process of the domain, a process of the computing device (e.g., such as another automated service, etc.). and/or the like.

At block 520, the computing device trains the personal virtual agent based on the accuracy metric. In some instances, the computing device may generate a feature vector using the communication passed as input into the personal virtual agent, the response output from the personal virtual agent, and/or the accuracy metric. The computing device may then execute a training iteration using the feature vector to revise how responses are generated by the personal virtual agent. In some instances, the personal virtual agent may be modified (e.g., by adjusting internal weights, modifying algorithms, etc.) such that subsequent response generated by the personal virtual agent are associated with higher accuracy metrics. The computing device may adjust the personal virtual agent through retraining each time the personal virtual agent generates a response (or when a response is associated with a particular accuracy metric, user input, and/or the like) to maximize the accuracy metric. Though the computing device is training the personal virtual agent according to the accuracy the metric, the result of such training is incrementally improving the responses generated by the personal virtual agent with respect to the particular user. As a result, the personal virtual agent may continuously improve interactions with the particular user, communicating with the particular user, tailoring communications to the particular user, etc.

Figure 6:
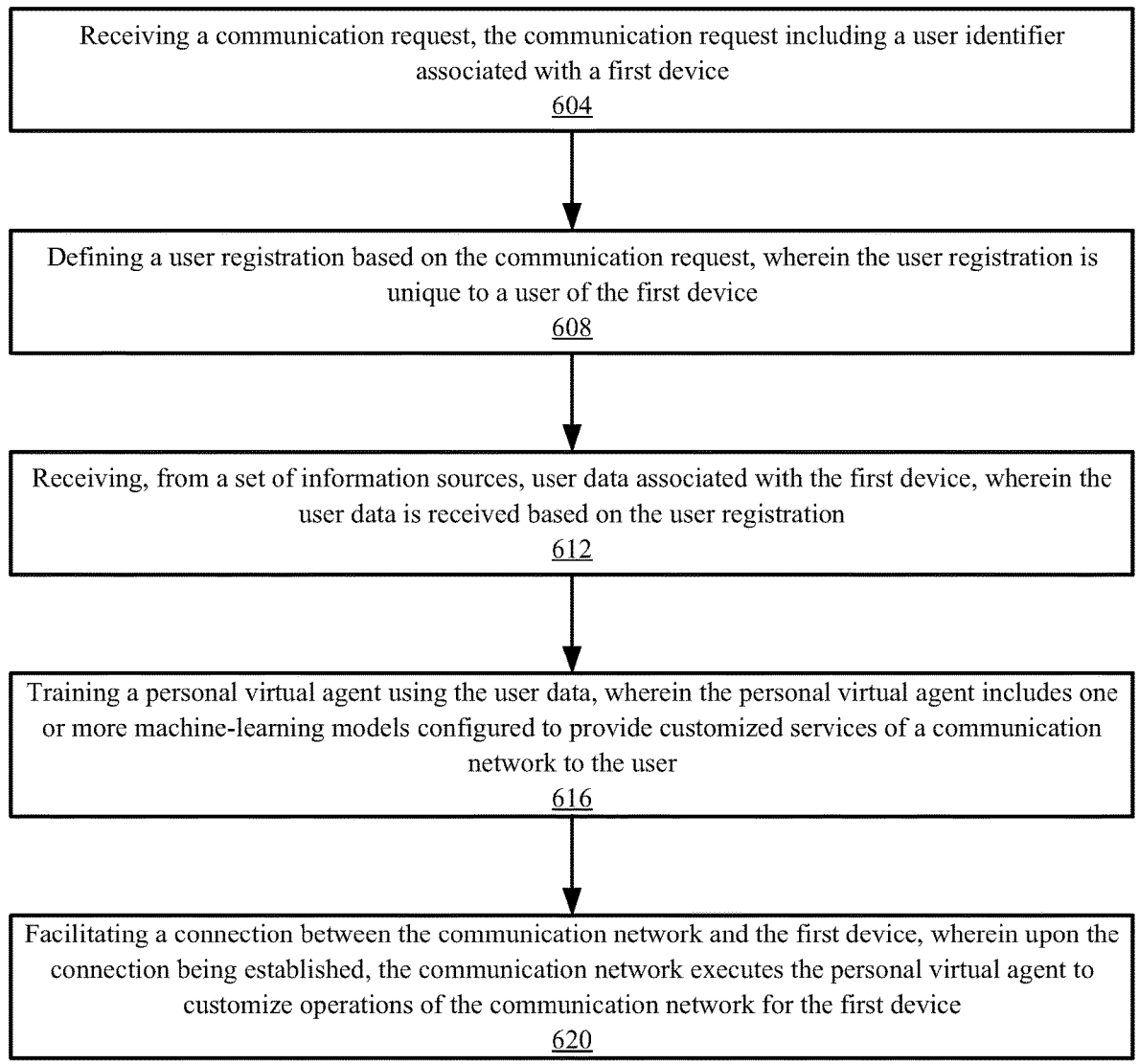
FIG. 6 illustrates a flowchart of example process for generating personal virtual agents configured to automate communications with a particular client device according to aspects of the present disclosure.

FIG. 6 illustrates a flowchart of example process for generating personal virtual agents configured to automate communications with a particular client device according to aspects of the present disclosure. At block 604, a computing device may receive a communication request. The communication request may include an identification of a first device (e.g., such as a device identifier, etc.). For example, a first device may transmit a communication request that includes a request for a new persona virtual agent for communicating with a particular domain. The computing device may be a component of a communication network (e.g., such as automated communication server 208, a domain, or another network) configured to generate and/or maintain personal virtual agents for one or more user devices with each personal virtual agent being configured for a particular domain or for general communications.

At block 608, the computing device defines a user registration based on the communication request. For example, the registration may be a user profile (as described in connection to FIG. 3B, etc.). The registration may be unique to the first device or unique to a user of the first device. The registration may include information included in or derivable from the communication request such as, but not limited to, the communication request (e.g., the type of personal virtual agent to be trained, a domain for which the personal virtual agent is to be trained, the user identifier, etc.), information associated with the first device (e.g., hardware components and/or software installed on the first device, network information such as media access control address or Internet Protocol address, etc.), location information, combinations thereof, or the like.

The registration may be usable to define a set of queries to a set of information sources (e.g., the first device or another device operated by a same user, websites, social media accounts, merchant accounts, databases, servers, or any other electronic system or user storing information associated with the user of the first device). Some queries may be configured to automatically obtain information form an information source. The computing device may include one or more application programming interfaces (or other interfaces) to translate a query into a native protocol of an information source. The translated query may be executed to automatically obtain information from the information source. The queries information may be specific (e.g., such as a name or date, etc.) or general (e.g., any information associated with the user of the first device). Some queries may be request information from a user. For example, the computing device may transmit those queries over one or more communication channels (e.g., an application or service, telephone, video conference, text messaging, instant messaging, email, etc.) to the first device or another device operated by the same user. The user may provide a response to the queries over a same or different communication channel.

At block 612, the computing device may receive user data associated with the first device from the set of information sources. In some instances, the computing device may receive user data from each information source of the set of information sources. In other instances, the user data may be received from a subset of the information sources. In still yet other instances, the computing device may not receive any data from the set of information sources. In those instances, the computing device may define the user data based on the information used to generate the registration.

At block 616, The computing device may train a personal virtual agent using the user data. The personal virtual agent may include one or more machine-learning models configured to provide customized services of a communication network to the user. For example, the personal virtual agent may be configured to communicate with the user on behalf of a domain using natural language communications (e.g., generated text, audio, and/or video communications). The one or more machine-learning models may include one or more neural networks (e.g., such as, but not limited to, large language models, generative adversarial networks, convolutional neural networks, recurrent neural networks, combinations thereof, or the like), single or multivariate classifiers, regression-based models, and/or the like. The one or more machine-learning models may be oriented as a pipeline in which the output of a machine-learning model may be passed as input into one or more other machine-learning models (including itself) to enable virtualized communications that approximate human communications. For example, the one or more machine-learning models may include speech-to-text models, natural language understanding (NLU) machine-learning models, large language models and/or generative machine-learning models (such as generative adversarial networks, etc.) configured to generate communications from one or more information sources and based on an input communication, text-to-speech, etc. The one or more machine-learning models may be trained using any of supervised learning, unsupervised learning, semi-supervised learning, self-supervised learning, reinforcement learning, or the like based on the particular machine-learning model being trained.

The one or more machine-learning models may be configured to personalize communications to the first device or the user thereof. For example, since the personal virtual agent is trained using information associated with the particular user that the personal virtual agent will be communicating with, the personal virtual agent may be configured to communicate using a preferred language, accent, cadence, diction, slang, phrases, etc. of the particular user.

At block 620, the computing device may facilitate a connection between the communication network and the first device. For example, the computing device may facilitate a connection between the first device and a domain (for which the personal virtual agent is trained, etc.). In some instances, the connection may be direct. In other instances, the connection may be indirect (e.g., through the computing device or another device in a same network as the computing device). When the first device connects to the communication network, the personal virtual agent may be executed (e.g., by the computing device, the communication network, by the first device, etc.). The personal virtual agent may communicate with the first device on behalf of the communication network allowing the first device to access any of the services and/or operations of the communication network using personalized communications. For example, the first device or the user thereof may communicate connect a customer service network of a home improvement domain. The computing device may connect the first device to the personal virtual agent trained for the first device for the home improvement domain. The personal virtual agent may communicate with the first device in place of a human or virtual agent of the home improvement domain to access any service or operation of the home improve domain (e.g., obtain product information, obtain account information, pay balances, return products or services, etc.).

Figure 7:
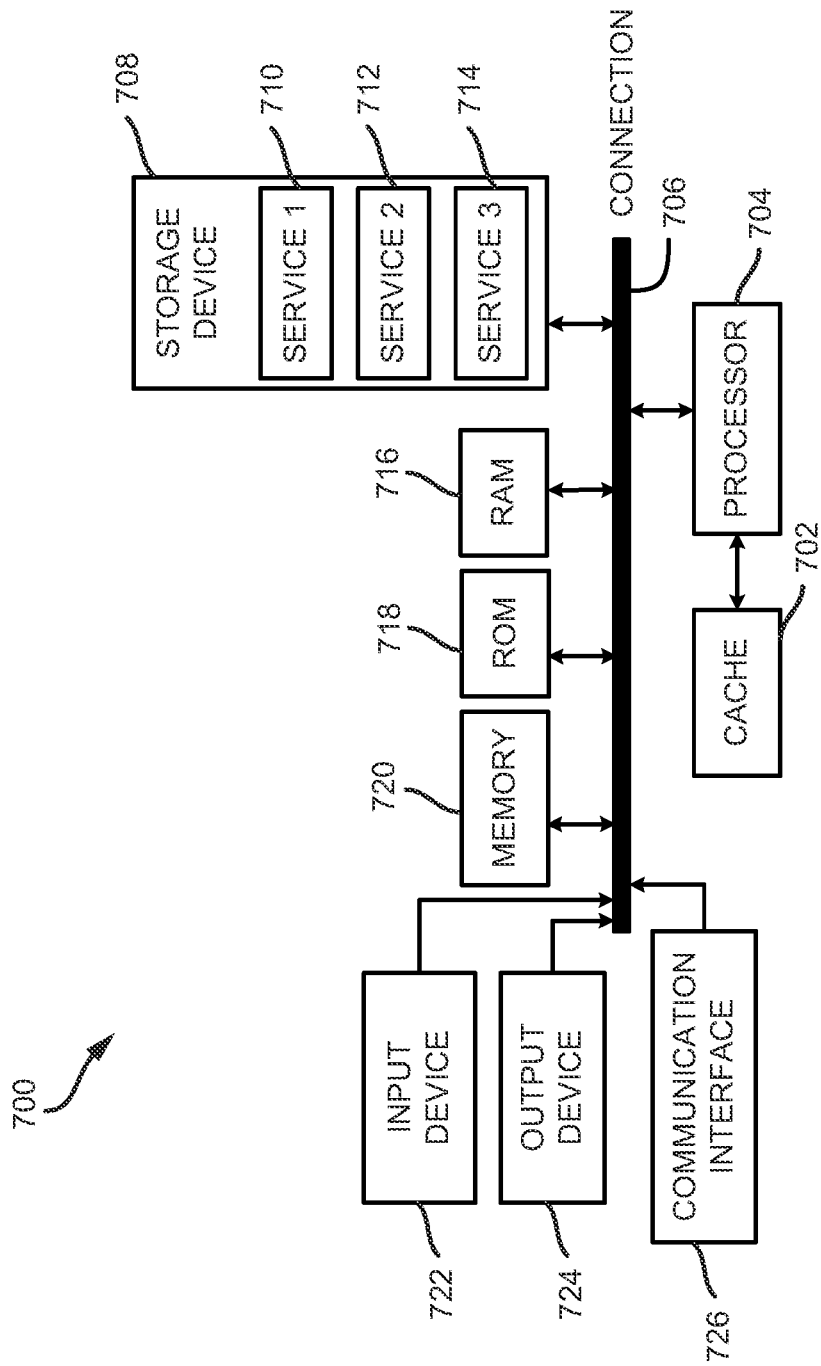
FIG. 7 illustrates an example computing system architecture including various components in electrical communication with each other and configured to implement aspects of the present disclosure.

FIG. 7 illustrates an example computing system architecture including various components in electrical communication with each other and configured to implement aspects of the present disclosure. FIG. 7 illustrates a computing system architecture 700 including various components in electrical communication with each other using a connection 706, such as a bus, in accordance with some implementations. Example system architecture 700 includes a processing unit (CPU or processor) 704 and a system connection 706 that couples various system components including the system memory 720, such as ROM 718 and RAM 716, to the processor 704. The system architecture 700 can include a cache 702 of high-speed memory connected directly with, in close proximity to, or integrated as part of the processor 704. The system architecture 700 can copy data from the memory 720 and/or the storage device 708 to the cache 702 for quick access by the processor 704. In this way, the cache can provide a performance boost that avoids processor 704 delays while waiting for data. These and other modules can control or be configured to control the processor 704 to perform various actions.

Other system memory 720 may be available for use as well. The memory 720 can include multiple different types of memory with different performance characteristics. The processor 704 can include any general-purpose processor and a hardware or software service, such as service 1 710, service 2 712, and service 3 714 stored in storage device 708, configured to control the processor 704 as well as a special-purpose processor where software instructions are incorporated into the actual processor design. The processor 704 may be a completely self-contained computing system, containing multiple cores or processors, a bus, memory controller, cache, etc. A multi-core processor may be symmetric or asymmetric.

To enable user interaction with the computing system architecture 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with the computing system architecture 700. The communications interface 726 can generally govern and manage the user input and system output. There is no restriction on operating on any particular hardware arrangement and therefore the basic features here may easily be substituted for improved hardware or firmware arrangements as they are developed.

Storage device 708 is a non-volatile memory and can be a hard disk or other types of computer readable media which can store data that are accessible by a computer, such as magnetic cassettes, flash memory cards, solid state memory devices, digital versatile disks, cartridges, RAMs 716, ROM 718, and hybrids thereof.

The storage device 708 can include services 710, 712, 714 for controlling the processor 704. Other hardware or software modules are contemplated. The storage device 708 can be connected to the system connection 706. In one aspect, a hardware module that performs a particular function can include the software component stored in a computer-readable medium in connection with the necessary hardware components, such as the processor 704, connection 706, output device 724, and so forth, to carry out the function.

The following examples describe example implementations of the present disclosure. Any reference to a series of examples is to be understood as a reference to each of those examples disjunctively (e.g., "Examples 1-4" is to be understood as "Examples 1, 2, 3, or 4").

Example 1 is a method comprising: receiving a communication request associated with a particular domain, the communication request including a user identifier associated with a first device; facilitating a connection between the first device and a personal virtual agent, the personal virtual agent having been generated for a user corresponding to the user identifier, wherein the personal virtual agent is a software service that executes to provide services associated with the particular domain to the user; executing the personal virtual agent using a subsequent communication from the user associated with the request to generate a response; generating, based on executing the personal virtual agent, an accuracy metric corresponding to the response generated by the personal virtual agent; and training the personal virtual agent based on the accuracy metric, wherein training the personal virtual agent improves subsequent responses generated by the personal virtual agent with respect to the user.

Example 2 is a method comprising: receiving a communication request, the communication request including a user identifier associated with a first device; defining a user registration based on the communication request, wherein the user registration is unique to a user of the first device; receiving, from a set of information sources, user data associated with the first device, wherein the user data is received based on the user registration; training a personal virtual agent using the user data, wherein the personal virtual agent includes one or more machine-learning models configured to provide customized services of a communication network to the user; and facilitating a connection between the communication network and the first device, wherein upon the connection being established, the communication network executes the personal virtual agent to customize operations of the communication network for the first device.

Example 3 is the method of any of example(s) 1-2 and 4-14, wherein determining the user identifier includes: generating a vocal pattern of the user from audio samples of the request; identifying a reference vocal pattern that matches the vocal pattern of the user, the reference vocal pattern being associated with a particular user; and determining that the particular user is the user.

Example 4 is the method of any of example(s) 1-3 and 5-14, wherein determining the user identifier includes: matching a telephone number of the first device to a reference telephone number, the reference telephone number being associated with a particular user; and determining that the particular user is the user.

Example 5 is the method of any of example(s) 1-4 and 7-14, wherein the personal virtual agent is configured to satisfy requests associated with multiple domains.

Example 6 is the method of any of example(s) 1-5 and 7-14, wherein executing the personal virtual agent using the request includes: determining data associated with the request is located within a device of the particular domain; and connecting the first device to an agent within the particular domain, wherein connecting the first device to the agent within the particular domain causes the agent to generate the response.

Example 7 is the method of any of example(s) 1-6 and 8-14, wherein the agent within the particular domain is an automated software service that is configured to satisfy requests for a plurality of users.

Example 8 is the method of any of example(s) 1-7 and 9-14, wherein connecting the first device to the personal virtual agent includes: identifying, based on the user identifier, the personal virtual agent from a plurality of personal virtual agents.

Example 9 is the method of any of example(s) 1-8 and 10-14, wherein the personal virtual agent is configured to provide services only to the user.

Example 10 is the method of any of example(s) 1-9 and 11-14, wherein the personal virtual agent includes a machine-learning model trained using historical interactions between the user and the particular domain.

Example 11 is the method of any of example(s) 1-10 and 12-14, wherein the personal virtual agent includes a sequence of machine-learning models configured to perform operations including: translating a first vocal communication that corresponds to the request into a natural language text representation of the first vocal communication; parsing the natural language text representation into a machine-readable request; generate a machine-readable response based on the machine-readable request, the machine-readable response including a representation of the response; generating, from the machine-readable response, a natural language text representation of the machine-readable response; and translating the natural language text representation into a second vocal communication, the second vocal communication being distributed to the first device.

Example 12 is the method of any of example(s) 1-11 and 13-14, wherein the personal virtual agent interacts with the user over a telephone connection.

Example 13 is the method of any of example(s) 1-12 and 14-14, wherein the personal virtual agent interacts with the user over an instant messaging connection.

Example 14 is the method of any of example(s) 1-13, wherein the personal virtual agent is configured to generate communications based on one or more personalized communication characteristics, wherein the personalized communication characteristics are selected by the user.

Example 15 is a system comprising: one or more processors; and a machine-readable storage medium storing instructions that when executed by the one or more processors, cause the one or more processors to perform any of example(s)s 1-14.

Example 15 is a machine-readable storage medium storing instructions that when executed by one or more processors, cause the one or more processors to perform any of example(s)s 1-14.

The disclosed system can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example, and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor. The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the terms "computer readable medium", "computer readable storage medium", "machine-readable medium" and "machine-readable storage medium" should be taken to include a single medium or multiple media (e.g., a centralized or distributed database, and/or associated caches and servers) that store the one or more sets of instructions. The terms "computer readable medium", "computer readable storage medium", "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a keypad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method comprising:
    training a personal virtual agent associated with a user, wherein the personal virtual agent is trained using historical interactions between the user and a particular domain, and wherein the personal virtual agent is configured to generate communications tailored to the user;
    receiving a communication request associated with the particular domain, wherein the communication request is associated with an unknown user device;
    instantiating a general virtual agent to generate communications for the unknown user device, wherein the general virtual agent is configured to resolve basic intents of users;
    receiving one or more communications from the unknown user device;
    establishing an identity of the unknown user device by processing the one or more communications with the general virtual agent, wherein the unknown user device is determined to be operated by the user; and wherein the user is associated with a user identifier;
    identifying, based on the user identifier, a first virtual agent within a sequence of virtual agents of an automated service hierarchy, wherein the sequence of virtual agents defines an order in which virtual agents are selected for connection to the user device, wherein the first virtual agent is the personal virtual agent that is configured to tailor communications to the user device; and
    facilitating a connection between the user device and the personal virtual agent.

2. The method of claim 1, further comprising:
    determining the user identifier by:
        generating a vocal pattern of the user from audio samples derived from the communication request;
        identifying a reference vocal pattern that matches the vocal pattern, the reference vocal pattern being associated with a particular user identifier; and
        determining that the user identifier corresponds to the particular user identifier.

3. The method of claim 1, wherein determining the user identifier includes:
    matching a telephone number of the unknown user device to a reference telephone number, the reference telephone number being associated with a particular user; and
    determining that the particular user is the user.

4. The method of claim 1, wherein the personal virtual agent is configured to satisfy requests associated with multiple domains.

5. The method of claim 1, further comprising:
    generating a response to a subsequent communication, wherein the response is generated by executing the personal virtual agent using the subsequent communication;
    determining data associated with the subsequent communication is associated with the particular domain; and
    connecting, based on the response, the user device to an agent device of the particular domain.

6. The method of claim 5, wherein the agent device of the particular domain is an automated software service that is configured to satisfy requests for a plurality of users.

7. The method of claim 1, wherein the sequence of virtual agents of the automated service hierarchy include at least one domain-based virtual agent trained to communicate with any user.

8. A system comprising:
one or more processors; and
a non-transitory computer-readable storage medium storing instructions that when executed by the one or more processors, cause the one or more processors to perform operations including:
training a personal virtual agent associated with a user, wherein the personal virtual agent is trained using historical interactions between the user and a particular domain, and wherein the personal virtual agent is configured to generate communications tailored to the user;
receiving a communication request associated with the particular domain, wherein the communication request is associated with an unknown user device;
instantiating a general virtual agent to generate communications for the unknown user device, wherein the general virtual agent is configured to resolve basic intents of users;
receiving one or more communications from the unknown user device;
establishing an identity of the unknown user device by processing the one or more communications with the general virtual agent, wherein the unknown user device is determined to be operated by the user; and wherein the user is associated with a user identifier;
identifying, based on the user identifier, a first virtual agent within a sequence of virtual agents of an automated service hierarchy, wherein the sequence of virtual agents defines an order in which virtual agents are selected for connection to the user device, wherein the first virtual agent is the personal virtual agent that is configured to tailor communications to the user device; and
facilitating a connection between the user device and the personal virtual agent.

9. The system of claim 8, wherein the operations further include:
determining the user identifier by:
generating a vocal pattern of the user from audio samples derived from the communication request;
identifying a reference vocal pattern that matches the vocal pattern, the reference vocal pattern being associated with a particular user identifier; and
determining that the user identifier corresponds to the particular user identifier.

10. The system of claim 8, wherein determining the user identifier includes:
matching a telephone number of the unknown user device to a reference telephone number, the reference telephone number being associated with a particular user; and
determining that the particular user is the user.

11. The system of claim 8, wherein the personal virtual agent is configured to satisfy requests associated with multiple domains.

12. The system of claim 8, wherein the operations further include:
generating a response to a subsequent communication, wherein the response is generated by executing the personal virtual agent using the subsequent communication;
determining data associated with the subsequent communication is associated with the particular domain; and
connecting, based on the response, the user device to an agent device of the particular domain.

13. The system of claim 12, wherein the agent device of the particular domain is an automated software service that is configured to satisfy requests for a plurality of users.

14. The system of claim 8, wherein the sequence of virtual agents of the automated service hierarchy include at least one domain-based virtual agent trained to communicate with any user.

15. A non-transitory computer-readable storage medium storing instructions that when executed by one or more processors, cause the one or more processors to perform operations including:
training a personal virtual agent associated with a user, wherein the personal virtual agent is trained using historical interactions between the user and a particular domain, and wherein the personal virtual agent is configured to generate communications tailored to the user;
receiving a communication request associated with the particular domain, wherein the communication request is associated with an unknown user device;
instantiating a general virtual agent to generate communications for the unknown user device, wherein the general virtual agent is configured to resolve basic intents of users;
receiving one or more communications from the unknown user device;
establishing an identity of the unknown user device by processing the one or more communications with the general virtual agent, wherein the unknown user device is determined to be operated by the user; and wherein the user is associated with a user identifier;
identifying, based on the user identifier, a first virtual agent within a sequence of virtual agents of an automated service hierarchy, wherein the sequence of virtual agents defines an order in which virtual agents are selected for connection to the user device, wherein the first virtual agent is the personal virtual agent that is configured to tailor communications to the user device; and
facilitating a connection between the user device and the personal virtual agent.

16. The non-transitory computer-readable storage medium of claim 15, wherein the operations further include:
determining the user identifier by:
generating a vocal pattern of the user from audio samples derived from the communication request;
identifying a reference vocal pattern that matches the vocal pattern, the reference vocal pattern being associated with a particular user identifier; and
determining that the user identifier corresponds to the particular user identifier.

17. The non-transitory computer-readable storage medium of claim 15, wherein determining the user identifier includes:
matching a telephone number of the unknown user device to a reference telephone number, the reference telephone number being associated with a particular user; and
determining that the particular user is the user.

18. The non-transitory computer-readable storage medium of claim 15, wherein the personal virtual agent is configured to satisfy requests associated with multiple domains.

19. The non-transitory computer-readable storage medium of claim 15, wherein the operations further include:

generating a response to a subsequent communication, wherein the response is generated by executing the personal virtual agent using the subsequent communication;

determining data associated with the subsequent communication is associated with the particular domain; and connecting, based on the response, the user device to an agent device of the particular domain.

20. The non-transitory computer-readable storage medium of claim 19, wherein the agent device of the particular domain is an automated software service that is configured to satisfy requests for a plurality of users.

* * * * *